US012780673B2

(12) United States Patent
Ito

(10) Patent No.: US 12,780,673 B2
(45) Date of Patent: Nov. 3, 2026

(54) ACTIVE MATERIAL, METHOD OF MANUFACTURING THE SAME, ELECTRODE, AND SECONDARY BATTERY

(71) Applicant: MURATA MANUFACTURING CO., LTD., Kyoto (JP)

(72) Inventor: Daisuke Ito, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 588 days.

(21) Appl. No.: 18/228,252

(22) Filed: Jul. 31, 2023

(65) Prior Publication Data

US 2023/0373798 A1 Nov. 23, 2023

Related U.S. Application Data

(63) Continuation of application No. PCT/JP2021/047211, filed on Dec. 21, 2021.

(30) Foreign Application Priority Data

Feb. 12, 2021 (JP) ................................ 2021-021266

(51) Int. Cl.
*C01B 33/32* (2006.01)
*H01M 10/0525* (2010.01)

(52) U.S. Cl.
CPC ....... *C01B 33/325* (2013.01); *H01M 10/0525* (2013.01); *C01P 2002/82* (2013.01); *C01P 2002/85* (2013.01); *C01P 2006/40* (2013.01)

(58) Field of Classification Search
CPC ................................................ H01M 10/0525
See application file for complete search history.

(56) References Cited

U.S. PATENT DOCUMENTS

2007/0248525 A1 10/2007 Fukuoka et al.
2014/0166929 A1 6/2014 Takeuchi et al.
2015/0228965 A1 8/2015 Ushiroda et al.
2016/0141609 A1 5/2016 Mikuni et al.
2018/0047981 A1* 2/2018 Ito .................... H01M 10/0525
2018/0219221 A1 8/2018 Yamauchi
(Continued)

FOREIGN PATENT DOCUMENTS

CN 107221669 A 9/2017
CN 110085811 A 8/2019
(Continued)

OTHER PUBLICATIONS

International Search Report of corresponding PCT application PCT/JP2021/047211, dated Mar. 1, 2022.
(Continued)

*Primary Examiner* — Stephan J Essex
(74) *Attorney, Agent, or Firm* — K&L Gates LLP

(57) ABSTRACT

An active material includes lithium, silicon, oxygen, a first element, a second element, and a third element as constituent elements. The first element includes boron, phosphorus, or both. The second element includes at least one of an alkali metal element, a transition element, or a typical element. The alkali metal element excludes lithium. The typical element excludes lithium, silicon, oxygen, boron, phosphorus, the alkali metal element, and an alkaline earth metal element. The third element includes the alkaline earth metal element.

5 Claims, 5 Drawing Sheets

(56) References Cited

U.S. PATENT DOCUMENTS

| | | | |
|---|---|---|---|
| 2019/0341652 | A1 | 11/2019 | Laughman et al. |
| 2020/0176760 | A1 | 6/2020 | Ito et al. |

FOREIGN PATENT DOCUMENTS

| | | | |
|---|---|---|---|
| JP | 863103815 | U | 7/1988 |
| JP | 2007290890 | A | 11/2007 |
| JP | 2011192453 | A | 9/2011 |
| JP | 2013047162 | A | 3/2013 |
| JP | 2013067543 | A | 4/2013 |
| JP | 2014051418 | A | 3/2014 |
| JP | 2014232680 | A | 12/2014 |
| JP | 2019518311 | A | 6/2019 |
| WO | 2011138964 | A1 | 11/2011 |
| WO | 2013018721 | A1 | 2/2013 |
| WO | 2014050086 | A1 | 4/2014 |
| WO | 2014200063 | A1 | 12/2014 |
| WO | 2017029945 | A1 | 2/2017 |
| WO | 2019031518 | A1 | 2/2019 |

OTHER PUBLICATIONS

Office Action issued for corresponding Chinese Patent Application No. 202180093312.X, dated Jul. 9, 2026. (4 pages.).

Search Report issued for corresponding Chinese Patent Application No. 202180093312.X, dated Jul. 6, 2026. (3 pages.).

* cited by examiner

ACTIVE MATERIAL, METHOD OF MANUFACTURING THE SAME, ELECTRODE, AND SECONDARY BATTERY

CROSS REFERENCE TO RELATED APPLICATIONS

The present application is a continuation of PCT patent application no. PCT/JP2021/047211, filed on Dec. 21, 2021, which claims priority to Japanese patent application no. 2021-021266, filed on Feb. 12, 2021, the entire contents of which are incorporated herein by reference.

BACKGROUND

The present application relates to an active material, a method of manufacturing the active material, an electrode, and a secondary battery.

Various kinds of electronic equipment, including mobile phones, have been widely used. Such widespread use has promoted the development of a secondary battery as a power source that is smaller in size and lighter in weight and allows for a higher energy density. The secondary battery includes electrodes, i.e., a positive electrode and a negative electrode, and an electrolytic solution. The electrodes include an active material contributing to an electrode reaction. A configuration of the secondary battery influences a battery characteristic. Accordingly, the configuration of the secondary battery has been considered in various ways.

Specifically, silicon dioxide is heated to generate a silicon oxide gas, and the silicon oxide gas is condensed into silicon oxide ($SiO_x$) powder. To improve a cyclability characteristic or other characteristics of a secondary battery including silicon oxide as a negative electrode active material, different elements are added to the silicon oxide. To obtain a negative electrode active material for high-capacity applications, a pyroxene silicic acid compound and a reduced product of tin oxide ($SnO_x$) acquired as a result of heat reduction using a reducing gas are used.

SUMMARY

Although consideration has been given in various ways to improve a battery characteristic of a secondary battery, the secondary battery still remains insufficient in a charge and discharge characteristic. Accordingly, there is still room for improvement in terms thereof.

It is therefore desirable to provide an active material, a method of manufacturing the active material, an electrode, and a secondary battery that each make it possible to achieve a superior charge and discharge characteristic.

An active material according to an embodiment of the present technology includes lithium, silicon, oxygen, a first element, a second element, and a third element as constituent elements. The first element includes boron, phosphorus, or both. The second element includes at least one of an alkali metal element, a transition element, or a typical element. The alkali metal element excludes lithium. The typical element excludes lithium, silicon, oxygen, boron, phosphorus, the alkali metal element, and an alkaline earth metal element. The third element includes the alkaline earth metal element. A content of silicon with respect to all the constituent elements excluding lithium, oxygen, and carbon is greater than or equal to 60 at % and less than or equal to 98 at %. A content of the first element with respect to all the constituent elements excluding lithium, oxygen, and carbon is greater than or equal to 1 at % and less than or equal to 15 at %. A content of the second element with respect to all the constituent elements excluding lithium, oxygen, and carbon is greater than or equal to 1 at % and less than or equal to 34 at %. A content of the third element with respect to all the constituent elements excluding lithium, oxygen, and carbon is greater than or equal to 0 at % and less than or equal to 6 at %. A first peak is detectable in an XPS spectrum of Si2p relating to the active material. The XPS spectrum of Si2p is measured by X-ray photoelectron spectroscopy (XPS) and defined by a horizontal axis representing a binding energy (eV) and a vertical axis representing a spectrum intensity. The first peak has an apex within a range of the binding energy of greater than or equal to 100 eV and less than or equal to 102 eV. A second peak is detectable in a Raman spectrum relating to the active material. The Raman spectrum is measured by Raman spectroscopy and defined by a horizontal axis representing a Raman shift ($cm^{-1}$) and a vertical axis representing a spectrum intensity. The second peak has an apex within a range of the Raman shift of greater than or equal to 600 $cm^{-1}$ and less than or equal to 640 $cm^{-1}$.

A method of manufacturing an active material according to an embodiment of the present technology includes: preparing silicate glass including, as constituent elements, silicon, oxygen, a first element, a second element, and a third element, the first element including boron, phosphorus, or both, the second element including at least one of an alkali metal element, a transition element, or a typical element, the alkali metal element excluding lithium, the typical element excluding lithium, silicon, oxygen, boron, phosphorus, the alkali metal element, and an alkaline earth metal element, the third element including the alkaline earth metal element; mixing the silicate glass with a carbon source to thereby obtain a mixture of the silicate glass and the carbon source; heating the mixture to thereby form an active material precursor including silicon, oxygen, the first element, the second element, and the third element as constituent elements; and adding lithium electrochemically, chemically, or thermally to the active material precursor to thereby manufacture the active material including lithium, silicon, oxygen, the first element, the second element, and the third element as constituent elements. A content of silicon with respect to all the constituent elements excluding lithium, oxygen, and carbon in the active material is greater than or equal to 60 at % and less than or equal to 98 at %. A content of the first element with respect to all the constituent elements excluding lithium, oxygen, and carbon in the active material is greater than or equal to 1 at % and less than or equal to 15 at %. A content of the second element with respect to all the constituent elements excluding lithium, oxygen, and carbon in the active material is greater than or equal to 1 at % and less than or equal to 34 at %. A content of the third element with respect to all the constituent elements excluding lithium, oxygen, and carbon in the active material is greater than or equal to 0 at % and less than or equal to 6 at %.

An electrode according to an embodiment of the present technology includes an active material. The active material has a configuration similar to the configuration of the active material according to an embodiment of the present technology described above.

A secondary battery according to an embodiment of the present technology includes a positive electrode, a negative electrode, and an electrolytic solution. The negative electrode includes an active material. The active material has a configuration similar to the configuration of the active material according to an embodiment of the present technology described above.

According to the active material, the electrode, or the secondary battery of an embodiment of the present technology, the active material includes lithium, silicon, oxygen, the first element, the second element, and the third element as constituent elements, and the content of each of the constituent elements satisfies the condition described above. Further, in the active material, the first peak is detectable in the XPS spectrum of Si2p measured by X-ray photoelectron spectroscopy, and the second peak is detectable in the Raman spectrum measured by Raman spectroscopy. Accordingly, it is possible to achieve a superior charge and discharge characteristic.

According to a method of manufacturing the active material of an embodiment of the present technology, the silicate glass including silicon, oxygen, the first element, the second element, and the third element as constituent elements is mixed with the carbon source, the mixture of the silicate glass and the carbon source is heated to form the active material precursor, and lithium is added electrochemically, chemically, or thermally to the active material precursor to thereby manufacture the active material. The content of each of the constituent elements in the active material satisfies the condition described above. Accordingly, it is possible to obtain an active material having a superior charge and discharge characteristic.

Note that effects of the present technology are not necessarily limited to those described herein and may include any of a series of effects in relation to the present technology.

DETAILED DESCRIPTION

One or more embodiments of the present technology are described below in further detail including with reference to the drawings.

First, a description is given of an active material according to an embodiment of the present technology. Note that a manufacturing method of an active material according to an embodiment of the present technology is a manufacturing method of the active material described herein, and is therefore descried below together.

The active material is a substance contributing to an electrode reaction. More specifically, the active material is a material into which an electrode reactant is insertable and from which an electrode reactant is extractable. The active material is used as an electrode material of an electrochemical device that is operable using the electrode reaction. In this case, the electrode reactant is inserted into the active material or extracted from the active material in an ionic state. Note that the active material may be used as an electrode material for a positive electrode (a positive electrode active material) or an electrode material for a negative electrode (a negative electrode active material).

Applications of the active material are not particularly limited as long as they are electrochemical devices that are operable using an electrode reaction. Specific examples of the applications of the active material include a secondary battery and a capacitor.

The electrode reactant is not particularly limited in kind and is specifically a light metal such as an alkali metal, an alkaline earth metal, or aluminum. Examples of the alkali metal include lithium, sodium, and potassium, and examples of the alkaline earth metal include beryllium, magnesium, and calcium.

Figure 1:
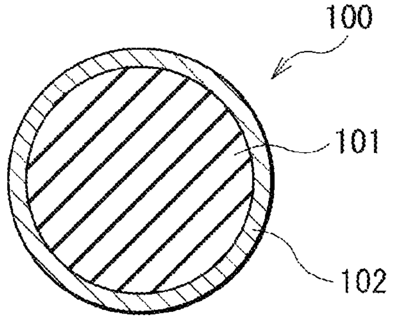
FIG. 1 is a sectional view of a configuration of an active material according to an embodiment of the present technology.

First, a description is given of a configuration of the active material. FIG. 1 illustrates a sectional configuration of an active material 100, which is an example of the active material.

Here, as illustrated in FIG. 1, the active material 100 includes a center part 101 and a covering part 102. Note that the center part 101 has a spherical three-dimensional shape in FIG. 1 for simple illustration; however, the three-dimensional shape of the center part 101 is not particularly limited.

The center part 101 is a main part of the active material 100 into which the electrode reactant is inserted and from which the electrode reactant is extracted. The center part 101 includes one or more kinds of lithium-containing carbon-reduced silicate glass.

Unlike ordinary silicate glass, the lithium-containing carbon-reduced silicate glass is a material resulting from a carbon reduction treatment and a lithium doping treatment on silicate glass, as to be described later. More specifically, silicate glass, which is a raw material, is subjected to the carbon reduction treatment using a carbon source as a reducing agent to thereby form carbon-reduced silicate glass. Thereafter, the carbon-reduced silicate glass is subjected to the lithium doping treatment to thereby form the lithium-containing carbon-reduced silicate glass.

In the lithium-containing carbon-reduced silicate glass formed by the carbon reduction treatment and the lithium doping treatment, a reduction reaction of the silicate glass, which is a raw material, is facilitated owing to the use of the carbon source as the reducing agent. This allows the silicate glass to be so reduced (activated) that the electrode reactant is sufficiently inserted into and extracted from the silicate glass. That is, the silicate glass is hardly reduced by an ordinary reduction treatment in which a reducing gas is used as a reducing agent, whereas the silicate glass is sufficiently reduced in a special reduction treatment, i.e., the carbon reduction treatment, in which the carbon source is used as a reducing agent. Thus, the lithium-containing carbon-reduced silicate glass formed using the carbon-reduced silicate glass has a physical property different from the physical property of silicate glass. Details of the physical property of the lithium-containing carbon-reduced silicate glass will be described later.

Specifically, the lithium-containing carbon-reduced silicate glass includes lithium, silicon, oxygen, a first element, a second element, and a third element, as constituent elements.

A content of each of the constituent elements with respect to all the constituent elements excluding lithium, oxygen, and carbon in the lithium-containing carbon-reduced silicate glass is set within a predetermined range. In a case where a total content of all the constituent elements excluding lithium, oxygen, and carbon is assumed to be 100 at %, the content of each of the constituent elements represents the content in atomic percent of the constituent element. Note that the content (at %) of each of the constituent elements is calculated based on a result of analysis of the lithium-containing carbon-reduced silicate glass using scanning electron microscope (SEM) and energy dispersive X-ray spectrometry (EDX).

Lithium is an auxiliary constituent element of the lithium-containing carbon-reduced silicate glass. Lithium is included as a constituent element in the lithium-containing carbon-reduced silicate glass as a result of, in a manufacturing process of the active material 100, the carbon-reduced silicate glass being formed by the carbon reduction treatment, following which the carbon-reduced silicate glass is subjected to the lithium doping treatment, as described above. That is, the lithium-containing carbon-reduced silicate glass is a material resulting from doping the carbon-reduced silicate glass with lithium.

A content of lithium in the lithium-containing carbon-reduced silicate glass is not particularly limited and may be set as desired.

Silicon is a primary constituent element of the lithium-containing carbon-reduced silicate glass. A content of silicon with respect to all the constituent elements excluding lithium, oxygen, and carbon is within a range from 60 at % to 98 at % both inclusive.

Oxygen is another primary constituent element of the lithium-containing carbon-reduced silicate glass, and is able to form an oxide with silicon. Thus, the lithium-containing carbon-reduced silicate glass includes $SiO_x$ (where x satisfies $0<x\leq2$) as a main component. The $SiO_x$ is supposed to include nano silicon dispersed in amorphous silicon dioxide ($SiO_2$). Alternatively, the $SiO_x$ is supposed to include, in a glass component, silicon into which the electrode reactant is sufficiently insertable and from which the electrode reactant is sufficiently extractable.

The first element includes one or more network-forming elements. More specifically, the first element includes boron, phosphorus, or both. A reason for this is that silicate glass including the first element in addition to silicon and oxygen as constituent elements is easily and sufficiently reduced in the carbon reduction treatment. This facilitates easy and stable formation of the carbon-reduced silicate glass in the carbon reduction treatment.

The term "network-forming element" is a generic term for a series of elements that are able to form a network former (network-forming oxide). The first element may thus include, for example, germanium in addition to boron and phosphorus described above.

A content of the first element with respect to all the constituent elements excluding lithium, oxygen, and carbon is within a range from 1 at % to 15 at % both inclusive. A reason for this is that the silicate glass is easily and sufficiently reduced in the carbon reduction treatment.

Note that, in a case where the first element includes two or more elements, the content of the first element is a sum of contents of these elements. Likewise, in a case where the second or third element includes two or more elements, a content of the second or third element to be described later is a sum of contents of these constituent elements.

The second element includes one or more of an alkali metal element, a transition element, or a typical element. A reason for this is that, unlike the third element to be described later, the second element hardly affects reducibility of the silicate glass in the carbon reduction treatment even if included in the silicate glass as a constituent element. Accordingly, the silicate glass is sufficiently reduced in the carbon reduction treatment even if the second element is included in the silicate glass as a constituent element.

The term "alkali metal element" is a generic term for a series of elements belonging to group 1 in the long period periodic table. Note that lithium described above is excluded from the alkali metal element described here. Specific examples of the alkali metal element thus include sodium and potassium.

The term "transition element" is a generic term for a series of elements belonging to any of groups 3 to 11 in the long period periodic table. Specifically, examples of the transition element include scandium, titanium, iron, zirconium, and cerium. However, the transition element is not particularly limited in kind as long as the transition element belongs to any of groups 3 to 11 in the long period periodic table. Thus, the examples of the transition element may further include elements including, without limitation, lanthanum, hafnium, tantalum, and tungsten other than the series of elements such as scandium described above.

The term "typical element" is a generic term for a series of elements belonging to any of groups 1, 2, and 12 to 18 in the long period periodic table. However, lithium, silicon, oxygen, boron, phosphorus, an alkali metal element, and an alkaline earth metal element are excluded from the typical element described here. Thus, specific examples of the typical element described here include aluminum, sulfur, chlorine, zinc, and bismuth. However, the typical element is not particularly limited in kind as long as the typical element belongs to any of groups 1, 2, and 12 to 18 in the long period periodic table. Thus, the examples of the typical element may further include elements including, without limitation, antimony other than the series of elements such as aluminum described above.

The content of the second element with respect to all the constituent elements excluding lithium, oxygen, and carbon is within a range from 1 at % to 34 at % both inclusive. A reason for this is that the silicate glass is easily and sufficiently reduced in the carbon reduction treatment even if the second element is included in the silicate glass as a constituent element.

The third element is an optional constituent element of the lithium-containing carbon-reduced silicate glass. The lithium-containing carbon-reduced silicate glass may thus include the third element as a constituent element or may not include the third element as a constituent element.

The third element includes one or more alkaline earth metal elements. The term "alkaline earth metal element" is a generic term for a series of elements belonging to group 2 in the long period periodic table. Specifically, examples of the alkaline earth metal element include magnesium, calcium, strontium, and barium.

Note that the content of the third element with respect to all the constituent elements excluding lithium, oxygen, and carbon is within a range from 0 at % to 6 at % both inclusive.

A reason why the lower limit of the content of the third element is 0 at % is that the lithium-containing carbon-reduced silicate glass may not include the third element as a constituent element because the third element is an optional constituent element of the lithium-containing carbon-reduced silicate glass, as described above.

A reason why the upper limit of the content of the third element is 6 at % is that the content of the third element should be within a range that does not affect the reducibility of the silicate glass in the carbon reduction treatment because the third element affects the reducibility of the silicate glass in the carbon reduction treatment, as described above.

Specifically, in a case where the content of the third element is greater than 6 at %, the silicate glass is hardly reduced in the carbon reduction treatment because an abundance of the third element in the silicate glass is excessively large. As a result, substantially no carbon-reduced silicate glass is formed. In contrast, in a case where the content of the third element is 6 at % or less, the silicate glass is easily reduced in the carbon reduction treatment because the abundance of the third element in the silicate glass is appropriately suppressed. As a result, the carbon-reduced silicate glass is substantially formed.

The covering part 102 covers a portion or all of a surface of the center part 101. Note that, in a case where the covering part 102 covers a portion of the surface of the center part 101, multiple locations separated from each other on the surface of the center part 101 may be covered with multiple covering parts 102.

The covering part 102 includes carbon as a constituent element to have an electrically conductive property. A reason for this is that electron conductivity of the active material 100 enhances in a case where the surface of the center part 101 is covered with the covering part 102 having an electrically conductive property, as compared with a case where the surface of the center part 101 is not covered with the covering part 102. A material included in the covering part 102 is not particularly limited as long as the material includes carbon as a constituent element.

Specifically, the covering part 102 is a film formed to cover the surface of the center part 101 through the use of thermal decomposition of the carbon source when a mixture of the silicate glass and the reducing agent (the carbon source) is heated in a manufacturing process of the active material. i.e., the carbon reduction treatment, as to be described later. In this case, the covering part 102 may include the carbon source as it is, may include a decomposition product of the carbon source (organic substance decomposition carbon), or may include both of them.

A thickness of the covering part 102 is not particularly limited. A reason for this is that the electron conductivity of the active material 100 enhances in a case where the covering part 102 is present even in a slight amount on the surface of the center part 101, as compared with a case where the covering part 102 is not present at all on the surface of the center part 101.

Next, a description is given of physical properties of the active material 100. In the following, two physical properties (a first physical property and a second physical property) are described in order that are specified based on results of analyses of the active material 100 using X-ray photoelectron spectroscopy (XPS) and Raman spectroscopy.

Figure 2:
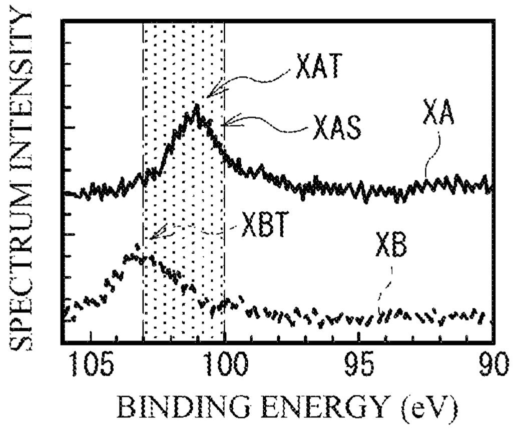
FIG. 2 is an example of a result of analysis (an XPS spectrum of Si2p) of the active material using XPS.

FIG. 2 illustrates an example of a result of the analysis (an XPS spectrum of Si2p) of the active material 100 using XPS for describing the first physical property. The XPS spectrum is defined by a horizontal axis representing a binding energy (eV), and a vertical axis representing a spectrum intensity. Note that the analysis result described here is an analysis result obtained after argon ion sputtering for a sputtering time of 1000 seconds.

FIG. 2 illustrates the XPS spectrum of the lithium-containing carbon-reduced silicate glass indicated with a solid line and also illustrates an XPS spectrum of the silicate glass indicated with a dashed line. That is, the lithium-containing carbon-reduced silicate glass whose XPS spectrum is detected as indicated with the solid line is obtainable by performing the carbon reduction treatment and the lithium doping treatment on the silicate glass whose XPS spectrum is detected as indicated with the dashed line. In FIG. 2, shading is applied to a range of the binding energy from 100 eV to 102 eV both inclusive.

As illustrated in FIG. 2, the lithium-containing carbon-reduced silicate glass has a physical property different from the physical property of the silicate glass in terms of the result of the analysis using XPS or the shape of the XPS spectrum.

Specifically, a peak XA (first peak) is detected in the solid-line XPS spectrum relating to the lithium-containing carbon-reduced silicate glass. The peak XA has an apex XAT within the range of the binding energy from 100 eV to 102 eV both inclusive.

In contrast, a peak XB is detected in the dashed-line XPS spectrum relating to the silicate glass. The peak XB has an apex XBT outside the range of the binding energy from 100 eV to 102 eV both inclusive rather than within the range.

The following tendencies are derived from these results of the analysis of the active material 100 using XPS or the shapes of the XPS spectra. Regarding the lithium-containing carbon-reduced silicate glass, the peak XA having the apex XAT is detected because silicate glass, which is the raw material of the lithium-containing carbon-reduced silicate glass, has been sufficiently reduced by the carbon reduction treatment and the carbon-reduced silicate glass obtained by the carbon reduction treatment has been subjected to the lithium doping treatment. In contrast, regarding the silicate glass, the peak XB having the apex XBT is detected because the silicate glass has not been subjected to the carbon reduction treatment and the lithium doping treatment yet. Accordingly, it is possible to identify which of the lithium-containing carbon-reduced silicate glass or the silicate glass the analyte is, based on the results of the analysis using XPS. The lithium-containing carbon-reduced silicate glass formed by the carbon reduction treatment and the lithium doping treatment therefore differs in physical property from the silicate glass in that the lithium-containing carbon-reduced silicate glass has the above-described first physical property in terms of XPS.

It is possible to identify the material of the center part 101 of the active material 100 by the procedure described here. That is, the center part 101 includes the lithium-containing carbon-reduced silicate glass in a case where the peak XA is detected by the analysis of the center part 101 using XPS, whereas the center part 101 includes the silicate glass in a case where the peak XB is detected.

Note that the silicate glass is hardly reduced by the ordinary reduction treatment, as described above. Accordingly, even if the ordinary reduction treatment is performed using the silicate glass, the silicate glass is hardly reduced and expected to exhibit the peak XB rather than the peak XA.

Figure 3:
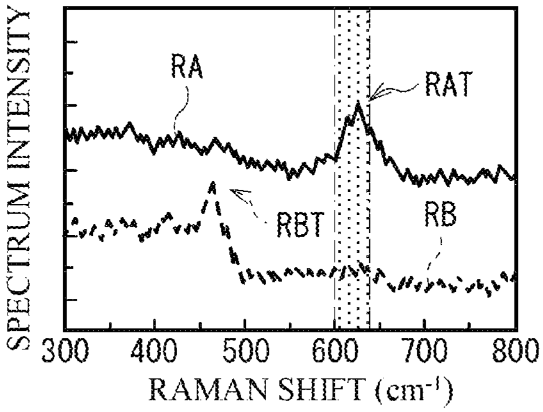
FIG. 3 is an example of a result of analysis (a Raman spectrum) of the active material using Raman spectroscopy.

FIG. 3 illustrates an example of a result of the analysis (a Raman spectrum) of the active material 100 using Raman spectroscopy for describing the second physical property.

The Raman spectrum is defined by a horizontal axis representing a Raman shift ($cm^{-1}$) and a vertical axis representing a spectrum intensity.

FIG. 3 illustrates the Raman spectrum of the lithium-containing carbon-reduced silicate glass indicated with a solid line and also illustrates a Raman spectrum of the silicate glass indicated with a dashed line. That is, the lithium-containing carbon-reduced silicate glass whose Raman spectrum is detected as indicated with the solid line is obtainable by performing the carbon reduction treatment and the lithium doping treatment on the silicate glass whose Raman spectrum is detected as indicated with the dashed line. In FIG. 3, shading is applied to a range of the Raman shift from 600 $cm^{-1}$ to 640 $cm^{-1}$ both inclusive.

As illustrated in FIG. 3, the lithium-containing carbon-reduced silicate glass has a physical property different from the physical property of the silicate glass in terms of the result of the analysis using Raman spectroscopy or the shape of the Raman spectrum.

Specifically, a peak RA (second peak) is detected in the solid-line Raman spectrum relating to the lithium-containing carbon-reduced silicate glass. The peak RA has an apex RAT within the range of the Raman shift from 600 $cm^{-1}$ to 640 $cm^{-1}$ both inclusive.

In contrast, a peak RB is detected in the dashed-line Raman spectrum relating to the silicate glass. The peak RB has an apex RBT outside the range of the binding energy from 600 $cm^{-1}$ to 640 $cm^{-1}$ both inclusive rather than within the range. Note that, just for reference, a peak having an apex within a range of the binding energy from 510 $cm^{-1}$ to 525 $cm^{-1}$ both inclusive is detected in a Raman spectrum relating to a single substance of silicon having crystallinity.

The following tendencies are derived from these results of the analysis of the active material 100 using Raman spectroscopy or the shapes of the Raman spectra. Regarding the lithium-containing carbon-reduced silicate glass, the peak RA having the apex RAT within the range from 600 $cm^{-1}$ to 640 $cm^{-1}$ both inclusive is detected because silicate glass, which is the raw material of the lithium-containing carbon-reduced silicate glass, has been sufficiently reduced by the carbon reduction treatment and the carbon-reduced silicate glass obtained by the carbon reduction treatment has been subjected to the lithium doping treatment. In contrast, regarding the silicate glass, the peak RB having the apex RBT outside the above-described range is detected because the silicate glass has not been subjected to the carbon reduction treatment and the lithium doping treatment yet. The lithium-containing carbon-reduced silicate glass formed by the carbon reduction treatment and the lithium doping treatment therefore differs in physical property from the silicate glass in that the lithium-containing carbon-reduced silicate glass has the above-described second physical property in terms of Raman spectroscopy.

It is possible to identify the material of the center part 101 of the active material 100 by the procedure described here. That is, the center part 101 includes the lithium-containing carbon-reduced silicate glass in a case where the peak RA is detected by the analysis of the center part 101 using Raman spectroscopy, whereas the center part 101 includes the silicate glass in a case where the peak RB is detected.

Note that the silicate glass is hardly reduced by the ordinary reduction treatment, as described above. Accordingly, even if the ordinary reduction treatment is performed using the silicate glass, the silicate glass is hardly reduced and expected to exhibit the peak RB rather than the peak RA.

These results indicate that, in the case of the active material 100 in which the center part 101 includes the lithium-containing carbon-reduced silicate glass, the peak XA is detectable in the XPS spectrum of Si2p measured by XPS (the first physical property), and the peak RA is detectable in the Raman spectrum measured by Raman spectroscopy (the second physical property). Thus, the active material 100 includes the lithium-containing carbon-reduced silicate glass in a case where both of the peaks XA and RA described above are detected by analyzing the active material 100 (the center part 101) using both XPS and Raman spectroscopy.

In contrast, the active material 100 does not include the lithium-containing carbon-reduced silicate glass in a case where the peak XA, the peak RA, or both are not detected by analyzing the active material 100 using both XPS and Raman spectroscopy.

The active material 100 (the center part 101) including the lithium-containing carbon-reduced silicate glass has the first physical property and the second physical property for the following reasons.

First, the crystallinity of a glass material including the above-described $SiO_x$ as a main component is made appropriate, because the reduction reaction of the lithium-containing carbon-reduced silicate glass proceeds more easily than that of the silicate glass. This makes it easy for the electrode reactant to be sufficiently and stably inserted into or extracted from the active material 100, and also makes it easy for the electrode reactant to be continuously inserted into or extracted from the active material 100 even if the electrode reaction is repeated.

Moreover, an irreversible capacity decreases upon an initial electrode reaction using lithium as the electrode reactant, because the lithium-containing carbon-reduced silicate glass includes lithium as a constituent element, that is, the lithium-containing carbon-reduced silicate glass is doped with lithium in advance by what is called pre-doping.

Figure 4:
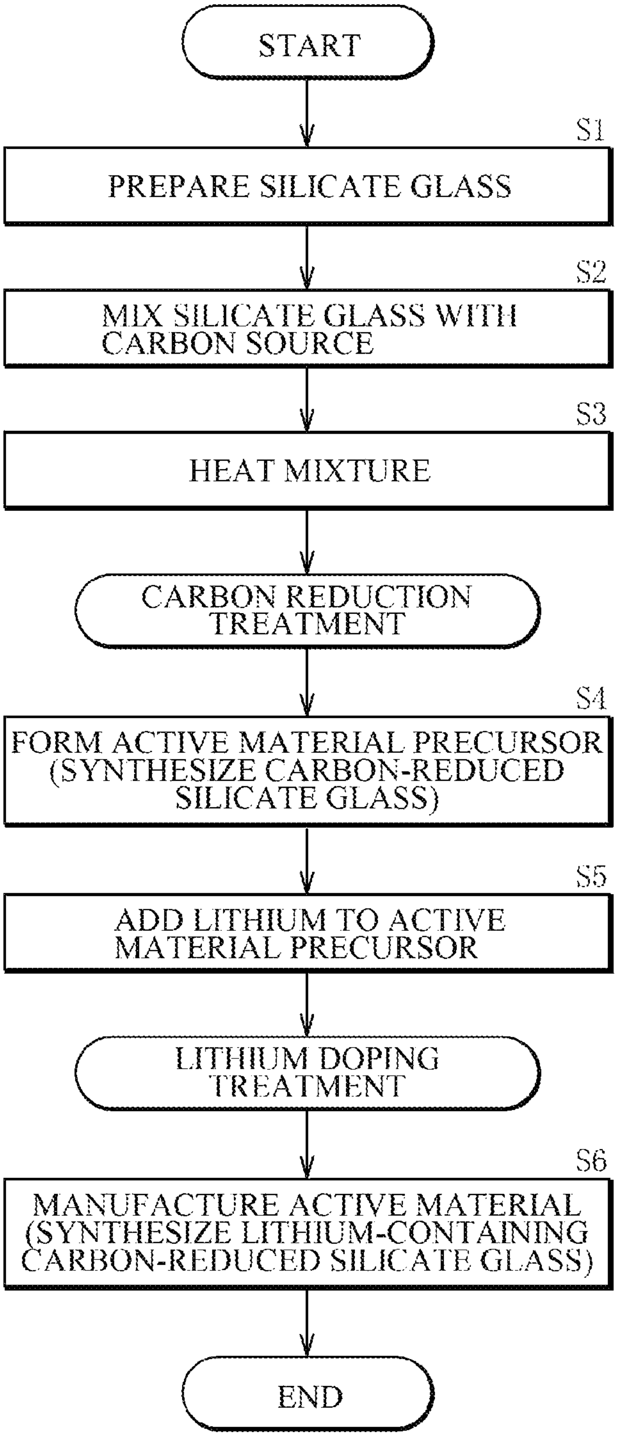
FIG. 4 is a flowchart for describing a method of manufacturing the active material according to an embodiment of the present technology.

Next, a description is given of a method of manufacturing the active material 100. FIG. 4 is a flowchart for describing the method of manufacturing the active material 100. Step numbers in parentheses described below correspond to step numbers illustrated in FIG. 4.

In a case of manufacturing the active material 100, first, silicate glass in a powder form is prepared as a raw material (Step S1). In this case, previously synthesized silicate glass may be acquired by a method such as purchase, or silicate glass may be synthesized by a user.

The silicate glass does not have the first physical property and the second physical property described above because the silicate glass has not been subjected to the carbon reduction treatment and the lithium doping treatment yet. Except this point, the silicate glass has a configuration substantially similar to that of the lithium-containing carbon-reduced silicate glass. That is, the silicate glass includes silicon, oxygen, the first element, the second element, and the third element as constituent elements. Details of each of the first element, the second element, and the third element are as described above.

Note that, in a case of synthesizing the silicate glass, silicon dioxide ($SiO_2$) is mixed with respective sources of the first element, the second element, and the third element, following which the mixture is heated. Conditions including, without limitation, a heating temperature and a heating time may be set as desired.

These sources are compounds including respective constituent elements. The compounds are not particularly limited in kind. Specifically, the compounds are, for example, oxides of the respective constituent elements. That is, examples of the source of the first element include boron trioxide ($B_2O_5$) and phosphorus pentoxide ($P_2O_5$). Examples of the source of the second element include sodium oxide ($Na_2O$), potassium oxide ($K_2O$), scandium oxide (ScO), titanium oxide ($TiO_2$), zirconium oxide ($Zr_2O$), cerium oxide (CeO), hafnium oxide ($HfO_2$), tantalum oxide ($Ta_2O_5$), tungsten oxide ($WO_3$), aluminum oxide ($Al_2O_3$), phosphorus pentasulfide ($P_2S_5$), lithium sulfide ($Li_2S$), magnesium sulfide (MgS), silicon tetrachloride ($SiCl_4$), zinc oxide ($ZnO_2$), bismuth oxide (BiO), and antimony oxide ($Sb_2O_3$). Examples of the source of the third element include magnesium oxide (MgO), calcium oxide (CaO), strontium oxide (SrO), and barium oxide (BaO).

The silicon dioxide and the respective sources of the first element, the second element, and the third element are thereby mixed with each other to form a solid solution. A glass body is thereby formed that includes silicon, oxygen, the first element, the second element, and the third element as constituent elements. As a result, the silicate glass is synthesized.

After preparing the silicate glass, the silicate glass is mixed with a carbon source to thereby obtain a mixture (Step S2). The term "carbon source" is a generic term for a material usable as a source of carbon. Specifically, the carbon source includes a carbon material, a carbonizable organic substance, or both. In other words, only the carbon material may be used, only the carbonizable organic substance may be used, or both of them may be used as the carbon source.

Examples of the carbon material include non-fibrous carbon and fibrous carbon. Examples of the non-fibrous carbon include carbon black, and examples of the fibrous carbon include carbon nanotubes and carbon nanofibers. Examples of the carbonizable organic substance include a saccharide and a polymer compound. Examples of the saccharide include sucrose, maltose, and cellulose. Examples of the polymer compound include polyimide, polyvinylidene difluoride, polymethyl methacrylate, polyvinylpyrrolidone, polyvinyl alcohol, and a polyacrylic acid. A reason why such a material is used as the carbon source is that the silicate glass is sufficiently reduced in the carbon reduction treatment. Another reason is that the covering part 102 having a sufficient electrically conductive property is easily and stably formed by using the carbon source, as to be described later.

In this case, the mixture may be stirred using a stirring apparatus. Conditions including, without limitation, a stirring speed and a stirring time may be set as desired.

Alternatively, a mixture in a paste form may be obtained by adding materials including, without limitation, a binder and a solvent to the mixture. In this case, it is preferable to stir the mixture using the stirring apparatus described above. The binder is not particularly limited in kind, and may specifically be one or more of polymer compounds including, without limitation, polyvinylidene difluoride, polyimide, and polymethyl methacrylate. The solvent is not particularly limited in kind, and may specifically be one or more of organic solvents including, without limitation, N-methyl-2-pyrrolidone. Note that a binder solution in which the binder is previously dissolved in a solvent may be used.

Thereafter, the mixture is heated (Step S3). In this case, one or more pieces of heating equipment including, without limitation, an oven are used. Conditions including, without limitation, a heating temperature and a heating time may be set as desired. Specifically, the heating temperature is within a range from 700° C. to 1400° C. both inclusive, and the heating time is within a range from 1 hour to 20 hours both inclusive.

In a case where a mixture including a binder is used, the mixture may be heated in two stages. Specifically, first, the mixture is subjected to first heating to dry the mixture. Although the condition of the first heating is not particularly limited, specifically, the heating temperature is within a range from 40° C. to 500° C. both inclusive, and the heating time is within a range from 10 minutes to 3 hours both inclusive. Thereafter, the dried mixture is pulverized. Lastly, the pulverized mixture is subjected to second heating. Although the condition of the second heating is not particularly limited, specifically, the heating temperature is within a range from 700° C. to 1200° C. both inclusive, and the heating time is within a range from 1 hour to 20 hours both inclusive.

The silicate glass is thereby subjected to the carbon reduction treatment, and the silicate glass is sufficiently reduced using the carbon source as a reducing agent. In other words, the crystalline state of $SiO_x$ is made so appropriate that the electrode reactant is allowed to be sufficiently inserted and extracted. Accordingly, carbon-reduced silicate glass is synthesized that includes $SiO_x$ as a main component. As a result, the center part 101 is obtained that includes the carbon-reduced silicate glass.

In addition, carbon (organic substance decomposition carbon) adheres to the surface of the center part 101 in the carbon reduction treatment through the use of thermal decomposition of the carbon source used as the reducing agent, as described above. As a result, the covering part 102 including carbon as a constituent element is formed in such a manner as to cover the surface of the center part 101.

An active material precursor including the center part 101 and the covering part 102 is thereby manufactured (Step S4).

Lastly, lithium is added electrochemically, chemically, or thermally to the active material precursor (Step S5) to thereby bond lithium to oxygen serving as a trapping site in the active material precursor.

In a case of adding lithium electrochemically to the active material precursor, an electrochemical device is fabricated using an electrode including the active material precursor, following which the electrochemical device is charged, in accordance with a procedure to be described below. Conditions including, without limitation, charging conditions are not particularly limited and may be set as desired.

In a case of adding lithium chemically to the active material precursor, the active material precursor is immersed in an organic lithium solution. The organic lithium solution is not particularly limited in kind, and specific examples thereof include one or more of solutions including, without limitation, a lithium naphthalenide solution. Conditions including, without limitation, a concentration of the organic lithium solution and an immersion time are not particularly limited and may be set as desired.

In a case of adding lithium thermally to the active material precursor, a mixture of the active material precursor and lithium is heated. Conditions including, without limitation, a mixture ratio between the active material precursor and lithium and heating conditions are not particularly limited and may be set as desired.

The active material precursor is thereby subjected to the lithium doping treatment, allowing lithium to be introduced into the active material precursor. That is, the carbon-reduced silicate glass is doped with lithium, allowing for synthesis of lithium-containing carbon-reduced silicate glass that includes lithium as a constituent element. As a result, the center part 101 is formed that includes the lithium-containing carbon-reduced silicate glass.

The active material 100 including the center part 101 and the covering part 102 is thereby manufactured (Step S6). In the active material 100 (the center part 101) including the lithium-containing carbon-reduced silicate glass manufactured by the carbon reduction treatment and the lithium doping treatment, the physical property of the silicate glass has changed owing to the carbon reduction treatment and the lithium doping treatment. The active material 100 thus has the two physical properties (the first physical property and the second physical property) described above.

In a case of manufacturing the active material 100, a composition or another factor of the silicate glass used as a raw material is so adjusted that the content of each of the constituent elements with respect to all the constituent elements excluding lithium, oxygen, and carbon satisfies the condition described above. Specifically, the content of silicon in the active material 100 is within the range from 60 at % to 98 at % both inclusive, the content of the first element in the active material 100 is within the range from 1 at % to 15 at % both inclusive, the content of the second element in the active material 100 is within the range from 1 at % to 34 at % both inclusive, and the content of the third element in the active material 100 is within the range from 0 at % to 6 at % both inclusive.

According to the active material 100 and the method of manufacturing the active material 100 described above, the following action and effects are obtained.

The active material 100 includes the lithium-containing carbon-reduced silicate glass.

Specifically, the active material 100 includes lithium, silicon, oxygen, the first element, the second element, and the third element as constituent elements, and the content of each of the constituent elements with respect to all the constituent elements excluding lithium, oxygen, and carbon satisfies the condition described above. Second, the peak XA having the apex XAT is detectable in the result of the analysis, i.e., the XPS spectrum of Si2p, of the active material 100 measured by XPS (the first physical property). Third, the peak RA having the apex RAT is detectable in the result of the analysis, i.e., the Raman spectrum, of the active material 100 measured by Raman spectroscopy (the second physical property).

Thus, unlike a case where the first physical property and the second physical property are not obtained, the reduction reaction of the silicate glass sufficiently proceeds, as described above. Accordingly, the crystallinity of the glass material including $SiO_x$ as a main component is made appropriate. This makes it easy for the electrode reactant to be sufficiently and stably inserted into or extracted from the active material 100, and also makes it easy for the electrode reactant to be continuously inserted into or extracted from the active material 100 even if the electrode reaction is repeated.

Moreover, the irreversible capacity decreases upon the initial electrode reaction using lithium as the electrode reactant, because the active material 100 includes lithium as a constituent element in advance. This allows a high capacity to be obtained upon the initial electrode reaction in a device including the active material 100.

As a result, an electrochemical device including the active material 100 is able to achieve a superior charge and discharge characteristic.

In particular, the active material 100 may include the center part 101 and the covering part 102. This allows the surface of the center part 101 including the lithium-containing carbon-reduced silicate glass to be covered with the covering part 102 having an electrically conductive property. This improves the electron conductivity of the active material 100. It is therefore possible to achieve higher effects.

According to the method of manufacturing the active material 100, the silicate glass including silicon, oxygen, the first element, the second element, and the third element as constituent elements is mixed with the carbon source, and the mixture of the silicate glass and the carbon source is heated to form the active material precursor (the carbon-reduced silicate glass), following which lithium is added to the active material precursor to thereby manufacture the active material 100 (the lithium-containing carbon-reduced silicate glass). Accordingly, the active material 100 is manufactured that includes the lithium-containing carbon-reduced silicic acid compound in which the content of each of the constituent elements satisfies the condition described above and which has the two physical properties (the first physical property and the second physical property). This makes it possible to obtain the active material 100 having a superior charge and discharge characteristic.

Moreover, to manufacture the active material 100 including $SiO_x$ as a main component, only simple and inexpensive treatments including, without limitation, a mixing treatment and a heating treatment have to be performed. This eliminates the need to perform a complicated and expensive treatment such as codeposition of two vapor deposition sources ($SiO_2$ and Si). It is therefore possible to manufacture the active material 100 easily and stably at low costs.

In particular, the carbon source may include, without limitation, the carbon material. This allows the silicate glass to be sufficiently reduced in the carbon reduction treatment, and allows the covering part 102 having a sufficient electrically conductive property to be formed easily and stably. It is therefore possible to achieve higher effects.

Next, a description is given of a secondary battery according to an embodiment of the present technology, which is an application example of the active material described above. Note that an electrode according to an embodiment of the present technology is a part (one constituent element) of the secondary battery, and is thus described below together.

A description is given below of a case where the active material described above is used as a negative electrode active material, and is therefore used for a negative electrode.

The secondary battery described here is a secondary battery that obtains a battery capacity by utilizing insertion and extraction of the electrode reactant. The secondary battery includes a positive electrode, a negative electrode, and an electrolytic solution.

In the secondary battery, a charge capacity of the negative electrode is greater than a discharge capacity of the positive electrode. In other words, an electrochemical capacity per unit area of the negative electrode is set to be greater than an electrochemical capacity per unit area of the positive electrode. This is for the purpose of preventing precipitation of the electrode reactant on a surface of the negative electrode in the middle of charging.

In the following, a description is given of an example case where the electrode reactant is lithium. A secondary battery utilizing insertion and extraction of lithium as the electrode reactant is what is called a lithium-ion secondary battery.

Figure 5:
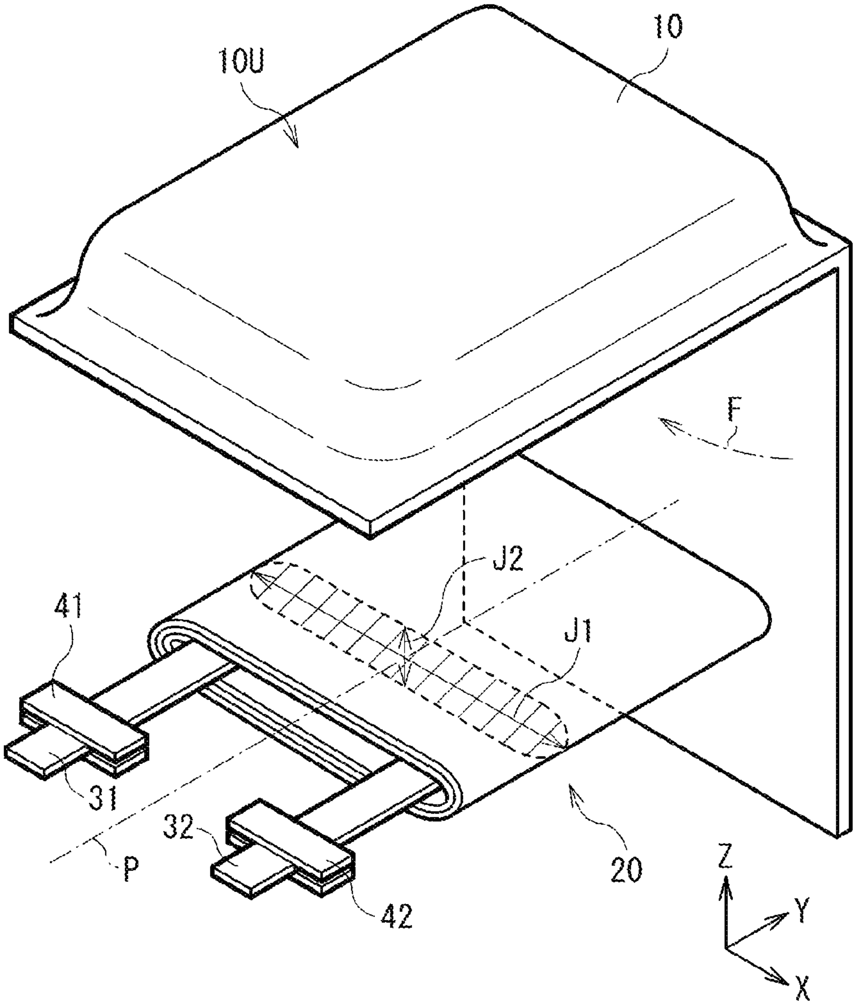
FIG. 5 is a perspective view of configurations of an electrode and a secondary battery of a laminated-film type according to an embodiment of the present technology.
Figure 6:
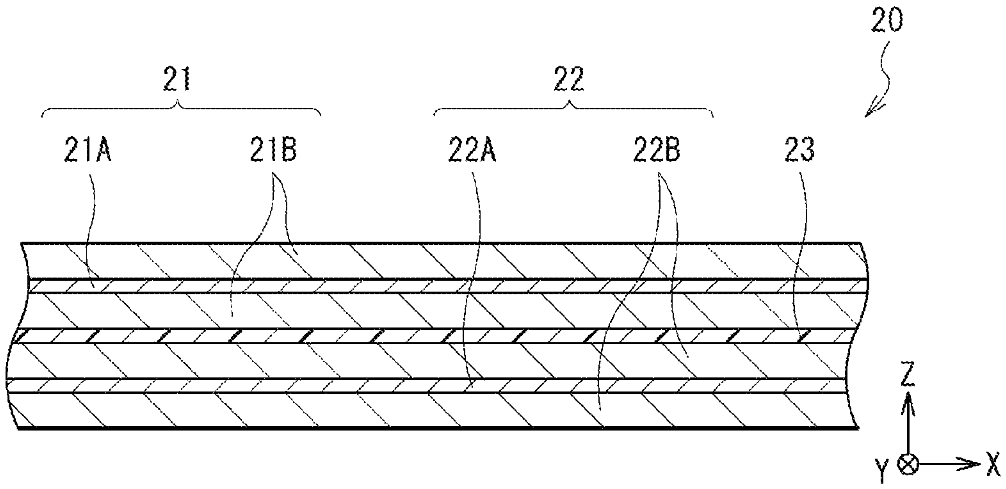
FIG. 6 is a sectional view of a configuration of a battery device illustrated in FIG. 5.
Figure 7:
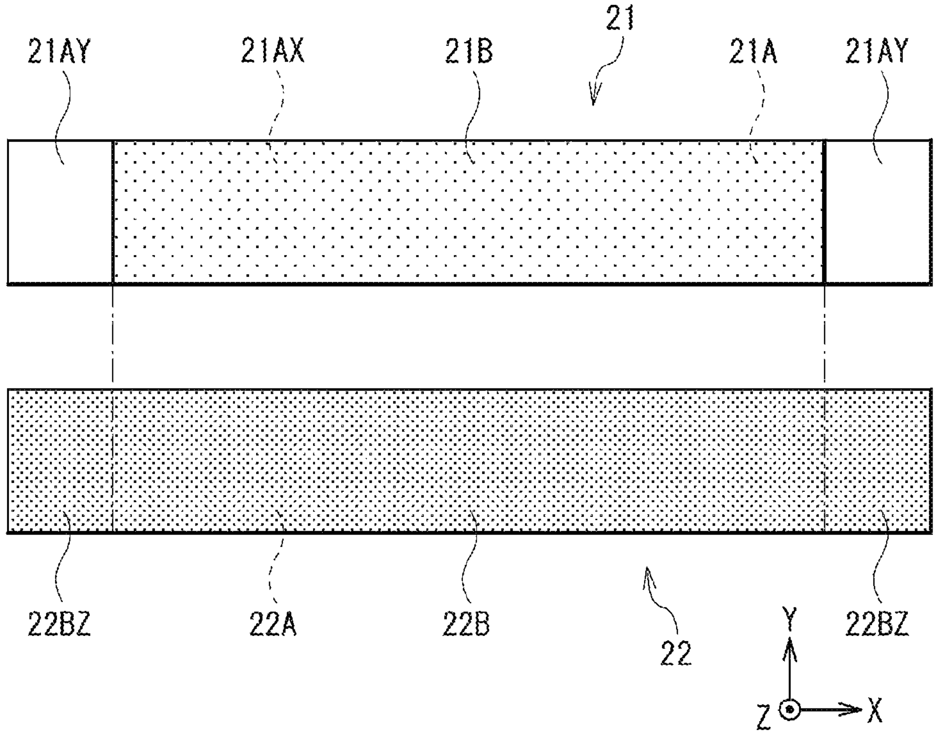
FIG. 7 is a plan view of respective configurations of a positive electrode and a negative electrode illustrated in FIG. 6.

FIG. 5 illustrates a perspective configuration of the secondary battery. FIG. 6 illustrates a sectional configuration of a battery device 20 illustrated in FIG. 5. FIG. 7 illustrates a plan configuration of each of a positive electrode 21 and a negative electrode 22 illustrated in FIG. 6.

Note that FIG. 5 illustrates a state in which an outer package film 10 and the battery device 20 are separated from each other, and illustrates a section of the battery device 20 along an XZ plane by a dashed line. FIG. 6 illustrates only a portion of the battery device 20. FIG. 7 illustrates a state in which the positive electrode 21 and the negative electrode 22 are separated from each other.

As illustrated in FIGS. 5 to 7, the secondary battery includes the outer package film 10, the battery device 20, a positive electrode lead 31, a negative electrode lead 32, and sealing films 41 and 42. The secondary battery described here is a secondary battery of a laminated-film type in which the outer package film 10 having flexibility or softness is used.

As illustrated in FIG. 5, the outer package film 10 is a flexible outer package member that contains the battery device 20. The outer package film 10 has a pouch-shaped structure in which the battery device 20 is sealed in a state of being contained inside the outer package film 10. The outer package film 10 thus contains the positive electrode 21, the negative electrode 22, and an electrolytic solution that are to be described later.

Here, the outer package film 10 is a single film-shaped member and is folded toward a folding direction F. The outer package film 10 has a depression part 10U to place the battery device 20 therein. The depression part 10U is what is called a deep drawn part.

Specifically, the outer package film 10 is a three-layered laminated film including a fusion-bonding layer, a metal layer, and a surface protective layer that are stacked in this order from an inner side. In a state in which the outer package film 10 is folded, outer edge parts of the fusion-bonding layer opposed to each other are fusion-bonded to each other. The fusion-bonding layer includes a polymer compound such as polypropylene. The metal layer includes a metal material such as aluminum. The surface protective layer includes a polymer compound such as nylon.

Note that the outer package film 10 is not particularly limited in configuration or the number of layers, and may be single-layered or two-layered, or may include four or more layers.

The sealing film 41 is interposed between the outer package film 10 and the positive electrode lead 31. The sealing film 42 is interposed between the outer package film 10 and the negative electrode lead 32. Note that the sealing film 41, the sealing film 42, or both may be omitted.

The sealing film 41 is a sealing member that prevents entry of, for example, outside air into the outer package film 10. The sealing film 41 includes a polymer compound such as a polyolefin that has adherence to the positive electrode lead 31. Examples of the polyolefin include polypropylene.

A configuration of the sealing film 42 is similar to that of the sealing film 41 except that the sealing film 42 is a sealing member that has adherence to the negative electrode lead 32. That is, the sealing film 42 includes a polymer compound such as a polyolefin that has adherence to the negative electrode lead 32.

As illustrated in FIGS. 5 and 6, the battery device 20 is a power generation device that includes the positive electrode 21, the negative electrode 22, a separator 23, and the electrolytic solution (not illustrated). The battery device 20 is contained inside the outer package film 10.

Here, the battery device 20 is what is called a wound electrode body. That is, in the battery device 20, the positive electrode 21 and the negative electrode 22 are stacked on each other with the separator 23 interposed therebetween, and the positive electrode 21, the negative electrode 22, and the separator 23 are wound about a winding axis P. The winding axis P is a virtual axis extending in a Y-axis direction. Thus, the positive electrode 21 and the negative electrode 22 are opposed to each other with the separator 23 interposed therebetween, and are wound.

A three-dimensional shape of the battery device 20 is not particularly limited. Here, the battery device 20 has an elongated shape. Accordingly, a section of the battery device 20 intersecting the winding axis P, that is, a section of the battery device 20 along the XZ plane, has an elongated shape defined by a major axis J1 and a minor axis J2. The major axis J1 is a virtual axis that extends in an X-axis direction and has a larger length than the minor axis J2. The minor axis J2 is a virtual axis that extends in a Z-axis direction intersecting the X-axis direction and has a smaller length than the major axis J1. Here, the battery device 20 has an elongated cylindrical three-dimensional shape. Thus, the section of the battery device 20 has an elongated, substantially elliptical shape.

The positive electrode 21 includes, as illustrated in FIGS. 6 and 7, a positive electrode current collector 21A and a positive electrode active material layer 21B.

The positive electrode current collector 21A has two opposed surfaces on each of which the positive electrode active material layer 21B is to be provided. The positive electrode current collector 21A includes an electrically conductive material such as a metal material. Examples of the metal material include aluminum.

Here, the positive electrode active material layer 21B is provided on each of the two opposed surfaces of the positive electrode current collector 21A. The positive electrode active material layer 21B includes one or more of positive electrode active materials into which lithium is insertable and from which lithium is extractable. Note that the positive electrode active material layer 21B may be provided only on one of the two opposed surfaces of the positive electrode current collector 21A on a side where the positive electrode 21 is opposed to the negative electrode 22. In addition, the positive electrode active material layer 21B may further include one or more of other materials including, without limitation, a positive electrode binder and a positive electrode conductor. A method of forming the positive electrode active material layer 21B is not particularly limited, and specifically includes one or more of methods including, without limitation, a coating method.

The positive electrode active material is not particularly limited in kind, and specific examples thereof include a lithium-containing compound. The lithium-containing compound is a compound that includes lithium and one or more transition metal elements as one or more constituent elements. The lithium-containing compound may further include one or more other elements as one or more constituent elements. The one or more other elements are not particularly limited in kind as long as the one or more other elements are each an element other than lithium and the transition metal elements. Specifically, the one or more other elements are any one or more of elements belonging to groups 2 to 15 in the long period periodic table. The lithium-containing compound is not particularly limited in kind, and is specifically an oxide, a phosphoric acid compound, a silicic acid compound, or a boric acid compound, for example.

Specific examples of the oxide include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.5}Co_{0.15}Al_{0.05}O_2$, $LiNi_{0.33}Co_{0.33}Mn_{0.33}O_2$, $Li_{1.2}Mn_{0.52}Co_{0.175}Ni_{0.102}$, $Li_{1.15}(Mn_{0.65}Ni_{0.22}Co_{0.13})O_2$, and $LiMn_2O_4$. Specific examples of the phosphoric acid compound include $LiFePO_4$, $LiMnPO_4$, $LiFe_{0.5}Mn_{0.5}PO_4$, and $LiFe_{0.3}Mn_{0.7}PO_4$.

The positive electrode binder includes one or more of materials including, without limitation, a synthetic rubber and a polymer compound. Examples of the synthetic rubber include a styrene-butadiene-based rubber, a fluorine-based rubber, and ethylene propylene diene. Examples of the polymer compound include polyvinylidene difluoride, polyimide, and carboxymethyl cellulose.

The positive electrode conductor includes one or more of electrically conductive materials including, without limitation, a carbon material. Examples of the carbon material include graphite, carbon black, acetylene black, and Ketjen black. Note that the electrically conductive material may be a metal material or a polymer compound, for example.

Here, the positive electrode active material layer 21B is provided only on a portion of the positive electrode current collector 21A on each of the two opposed surfaces of the positive electrode current collector 21A. Accordingly, a portion of the positive electrode current collector 21A on which the positive electrode active material layer 21B is not provided is exposed without being covered with the positive electrode active material layer 21B.

Specifically, the positive electrode current collector 21A extends in a longitudinal direction (X-axis direction) as illustrated in FIG. 7, and includes a covered part 21AX and paired uncovered parts 21AY. The covered part 21AX is a portion that is located at the middle part of the positive electrode current collector 21A in the longitudinal direction and on which the positive electrode active material layer 21B is provided. The paired uncovered parts 21AY are portions that are located at respective end parts of the positive electrode current collector 21A in the longitudinal direction and on which the positive electrode active material layer 21B is not provided. Accordingly, the covered part 21AX is covered with the positive electrode active material layer 21B, whereas the paired uncovered parts 21AY are exposed without being covered with the positive electrode active material layer 21B. In FIG. 7, the positive electrode active material layer 21B is lightly shaded.

The negative electrode 22 includes, as illustrated in FIGS. 6 and 7, a negative electrode current collector 22A and a negative electrode active material layer 22B.

The negative electrode current collector 22A has two opposed surfaces on each of which the negative electrode active material layer 22B is to be disposed. The negative electrode current collector 22A includes an electrically conductive material such as a metal material. Examples of the metal material include copper.

Here, the negative electrode active material layer 22B is provided on each of the two opposed surfaces of the negative electrode current collector 22A. The negative electrode active material layer 22B includes one or more of negative electrode active materials into which lithium is insertable and from which lithium is extractable. The negative electrode active material has a configuration similar to that of the active material described above. Note that the negative electrode active material layer 22B may be provided only on one of the two opposed surfaces of the negative electrode current collector 22A on a side where the negative electrode 22 is opposed to the positive electrode 21. In addition, the negative electrode active material layer 22B may further include one or more of other materials including, without limitation, a negative electrode binder and a negative electrode conductor. A method of forming the negative electrode active material layer 22B is not particularly limited, and specifically includes one or more of methods including, without limitation, a coating method, a vapor-phase method, a liquid-phase method, a thermal spraying method, and a firing (sintering) method.

Note that the negative electrode active material layer 22B may further include another negative electrode active material. The other negative electrode active material is not particularly limited in kind, and specific examples thereof include a carbon material, a metal-based material, or both, for example. A reason for this is that a high energy density is obtainable. Examples of the carbon material include graphitizable carbon, non-graphitizable carbon, and graphite (natural graphite and artificial graphite). The metal-based material is a material that includes, as one or more constituent elements, one or more elements among metal elements and metalloid elements that are each able to form an alloy with lithium. Specific examples of such metal elements and metalloid elements include silicon, tin, or both. The metal-based material may be a simple substance, an alloy, a compound, a mixture of two or more thereof, or a material including two or more phases thereof. Specific examples of the metal-based material include $TiSi_2$ and $SiO_x$ ($0<x\leq 2$ or $0.2<x<1.4$).

Details of the negative electrode binder are similar to those of the positive electrode binder. Details of the negative electrode conductor are similar to those of the positive electrode conductor.

Here, the negative electrode active material layer 22B is provided on the entire negative electrode current collector 22A on each of the two opposed surfaces of the negative electrode current collector 22A. Accordingly, the negative electrode current collector 22A is entirely covered with the negative electrode active material layer 22B without being exposed.

Specifically, as illustrated in FIG. 7, the negative electrode current collector 22A extends in the longitudinal direction (X-axis direction), and the negative electrode active material layer 22B includes paired non-opposed parts 22BZ. The paired non-opposed parts 22BZ are opposed to the paired uncovered parts 21AY. That is, the paired non-opposed parts 22BZ are not opposed to the positive electrode active material layer 21B and thus do not contribute to charging and discharging reactions. In FIG. 7, the negative electrode active material layer 22B is darkly shaded.

The negative electrode active material layer 22B is entirely provided on each of the two opposed surfaces of the negative electrode current collector 22A, whereas the positive electrode active material layer 21B is provided only on a portion (the covered part 21AX) of each of the two opposed surfaces of the positive electrode current collector 21A, in order to prevent lithium extracted from the positive electrode active material layer 21B at the time of charging from precipitating on the surface of the negative electrode 22.

In a case of examining whether the two physical properties (the first physical property and the second physical property) described above are obtained ex post facto, i.e., after the completion of the secondary battery, it is preferable to use the non-opposed parts 22BZ as the negative electrode active material layer 22B for collecting the negative electrode active material for analysis. A reason for this is that the non-opposed parts 22BZ hardly contribute to the charging and discharging reactions, and the state (e.g., the composition and the physical property) of the negative electrode active material (the lithium-containing carbon-reduced silicate glass) is thus easily maintained as the state at the time of forming the negative electrode 22 without being influenced by the charging and discharging reactions. Accordingly, it is possible to examine whether the two physical properties are obtained in a highly stable and reproducible manner even in a case where the secondary battery has been used.

As illustrated in FIG. 6, the separator 23 is an insulating porous film interposed between the positive electrode 21 and the negative electrode 22, and allows lithium ions to pass therethrough while preventing contact (a short circuit) between the positive electrode 21 and the negative electrode 22. The separator 23 includes a polymer compound such as polyethylene.

The electrolytic solution includes a solvent and an electrolyte salt. The positive electrode 21, the negative electrode 22, and the separator 23 are each impregnated with the electrolytic solution.

The solvent includes one or more of non-aqueous solvents (organic solvents), and the electrolytic solution including the non-aqueous solvent(s) is what is called a non-aqueous electrolytic solution. Examples of the non-aqueous solvent include esters and ethers. More specifically, examples of the non-aqueous solvent include a carbonic-acid-ester-based compound, a carboxylic-acid-ester-based compound, and a lactone-based compound.

Examples of the carbonic-acid-ester-based compound include a cyclic carbonic acid ester and a chain carbonic acid ester. Examples of the cyclic carbonic acid ester include ethylene carbonate and propylene carbonate. Examples of the chain carbonic acid ester include dimethyl carbonate, diethyl carbonate, and methyl ethyl carbonate. Examples of the carboxylic-acid-ester-based compound include ethyl acetate, ethyl propionate, and ethyl trimethylacetate. Examples of the lactone-based compound include γ-butyrolactone and γ-valerolactone. Examples of the ethers other than the lactone-based compounds described above include 1,2-dimethoxyethane, tetrahydrofuran, 1,3-dioxolane, and 1,4-dioxane.

Examples of the non-aqueous solvent further include an unsaturated cyclic carbonic acid ester, a halogenated carbonic acid ester, a sulfonic acid ester, a phosphoric acid ester, an acid anhydride, a nitrile compound, and an isocyanate compound. A reason for this is that chemical stability of the electrolytic solution improves.

Specific examples of the unsaturated cyclic carbonic acid ester include vinylene carbonate, vinylethylene carbonate, and methylene ethylene carbonate. Examples of the halogenated carbonic acid ester include fluoroethylene carbonate and difluoroethylene carbonate. Examples of the sulfonic acid ester include propane sultone and propene sultone. Examples of the phosphoric acid ester include trimethyl phosphate. Examples of the acid anhydride include a cyclic carboxylic acid anhydride, a cyclic disulfonic acid anhydride, and a cyclic carboxylic acid sulfonic acid anhydride. Examples of the cyclic carboxylic acid anhydride include succinic anhydride, glutaric anhydride, and maleic anhydride. Examples of the cyclic disulfonic acid anhydride include ethane disulfonic anhydride and propane disulfonic anhydride. Examples of the cyclic carboxylic acid sulfonic acid anhydride include sulfobenzoic anhydride, sulfopropionic anhydride, and sulfobutyric anhydride. Examples of the nitrile compound include acetonitrile and succinonitrile. Examples of the isocyanate compound include hexamethylene diisocyanate.

The electrolyte salt includes one or more of light metal salts including, without limitation, a lithium salt. Examples of the lithium salt include lithium hexafluorophosphate ($LiPF_6$), lithium tetrafluoroborate ($LiBF_4$), lithium trifluoromethanesulfonate ($LiCF_3SO_3$), lithium bis(fluorosulfonyl)imide ($LiN(FSO_2)_2$), lithium bis(trifluoromethanesulfonyl)imide ($LiN(CF_3SO_2)_2$), lithium tris (trifluoromethanesulfonyl)methide ($LiC(CF_3SO_2)_3$), and lithium bis(oxalato)borate ($LiB(C_2O_4)_2$). A content of the electrolyte salt is not particularly limited; however, the content is within a range from 0.3 mol/kg to 3.0 mol/kg both inclusive with respect to the solvent. A reason for this is that high ion conductivity is obtainable.

As illustrated in FIG. 5, the positive electrode lead 31 is a positive electrode terminal coupled to the positive electrode 21. More specifically, the positive electrode lead 31 is coupled to the positive electrode current collector 21A. The positive electrode lead 31 is led from an inside to an outside of the outer package film 10. The positive electrode lead 31 includes an electrically conductive material such as aluminum. The positive electrode lead 31 is not particularly limited in shape, and specifically has a shape such as a thin plate shape or a meshed shape.

As illustrated in FIG. 5, the negative electrode lead 32 is a negative electrode terminal coupled to the negative electrode 22. More specifically, the negative electrode lead 32 is coupled to the negative electrode current collector 22A. The negative electrode lead 32 is led from the inside to the outside of the outer package film 10. The negative electrode lead 32 includes an electrically conductive material such as copper. Here, the negative electrode lead 32 is led in a direction similar to that in which the positive electrode lead 31 is led. Note that details of a shape of the negative electrode lead 32 are similar to those of the shape of the positive electrode lead 31.

Upon charging the secondary battery, in the battery device 20, lithium is extracted from the positive electrode 21, and the extracted lithium is inserted into the negative electrode 22 via the electrolytic solution. Upon discharging the secondary battery, in the battery device 20, lithium is extracted from the negative electrode 22, and the extracted lithium is inserted into the positive electrode 21 via the electrolytic solution. Upon charging and discharging, lithium is inserted and extracted in an ionic state.

In a case of manufacturing the secondary battery, the positive electrode 21 and the negative electrode 22 are fabricated and the electrolytic solution is prepared, following which the secondary battery is fabricated using the positive electrode 21, the negative electrode 22, and the electrolytic solution, in accordance with a procedure to be described below.

First, a mixture (a positive electrode mixture) in which materials including, without limitation, the positive electrode active material, the positive electrode binder, and the positive electrode conductor are mixed with each other is put into a solvent to thereby prepare a positive electrode mixture slurry in a paste form. The solvent may be an aqueous solvent or an organic solvent. Thereafter, the positive electrode mixture slurry is applied on the two opposed surfaces of the positive electrode current collector 21A to thereby form the positive electrode active material layers 21B. Thereafter, the positive electrode active material layers 21B may be compression-molded by means of, for example, a roll pressing machine. In this case, the positive electrode active material layers 21B may be heated. The positive electrode active material layers 21B may be compression-molded multiple times. In this manner, the positive electrode active material layers 21B are formed on the respective two opposed surfaces of the positive electrode current collector 21A. As a result, the positive electrode 21 is fabricated.

The negative electrode 22 is formed by a procedure similar to the fabrication procedure of the positive electrode 21 described above. Specifically, first, a mixture (a negative electrode mixture) in which materials including, without limitation, the negative electrode active material, the negative electrode binder, and the negative electrode conductor are mixed with each other is put into a solvent to thereby prepare a negative electrode mixture slurry in a paste form. Thereafter, the negative electrode mixture slurry is applied on the two opposed surfaces of the negative electrode current collector 22A to thereby form the negative electrode active material layers 22B. Thereafter, the negative electrode active material layers 22B may be compression-molded. In this manner, the negative electrode active material layers 22B are formed on the respective two opposed surfaces of the negative electrode current collector 22A. As a result, the negative electrode 22 is fabricated.

The electrolyte salt is put into the solvent. The solvent may be an aqueous solvent or an organic solvent. The electrolyte salt is thereby dispersed or dissolved in the solvent. As a result, the electrolytic solution is prepared.

First, the positive electrode lead 31 is coupled to the positive electrode current collector 21A of the positive electrode 21 by a method such as a welding method, and the negative electrode lead 32 is coupled to the negative electrode current collector 22A of the negative electrode 22 by a method such as a welding method.

Thereafter, the positive electrode 21 and the negative electrode 22 are stacked on each other with the separator 23 interposed therebetween, following which the stack of the positive electrode 21, the negative electrode 22, and the separator 23 is wound to thereby fabricate a wound body. The wound body has a configuration similar to that of the battery device 20 except that the positive electrode 21, the negative electrode 22, and the separator 23 are each not impregnated with the electrolytic solution. Thereafter, the wound body is pressed by means of, for example, a pressing machine to thereby shape the wound body into an elongated shape.

Thereafter, the wound body is placed inside the depression part 10U, following which the outer package film 10 (the fusion-bonding layer/the metal layer/the surface protective layer) is folded to thereby cause portions of the outer package film 10 to be opposed to each other. Thereafter, outer edge parts of two sides of the outer package film 10 (the fusion-bonding layer) opposed to each other are bonded to each other by a method such as a thermal-fusion-bonding method to thereby contain the wound body in the outer package film 10 having the pouch shape.

Lastly, the electrolytic solution is injected into the outer package film 10 having the pouch shape, following which outer edge parts of the remaining one side of the outer package film 10 (the fusion-bonding layer) are bonded to each other by a method such as a thermal-fusion-bonding method. In this case, the sealing film 41 is interposed between the outer package film 10 and the positive electrode lead 31, and the sealing film 42 is interposed between the outer package film 10 and the negative electrode lead 32. The wound body is thereby impregnated with the electrolytic solution. Thus, the battery device 20 is fabricated, and the battery device 20 is sealed in the outer package film 10 having the pouch shape. As a result, the secondary battery is assembled.

The assembled secondary battery is charged and discharged. Various conditions including, for example, an environment temperature, the number of times of charging and discharging (the number of cycles), and charging and discharging conditions may be set as desired. As a result, a film is formed on a surface of each of the positive electrode 21 and the negative electrode 22, which electrochemically stabilizes a state of the secondary battery. As a result, the secondary battery of the laminated-film type including the outer package film 10 is completed.

According to the secondary battery, the negative electrode active material of the negative electrode 22 has a configuration similar to that of the active material described above. In this case, it becomes easy for lithium to be sufficiently and stably inserted into or extracted from the negative electrode active material, making it easy for lithium to be continuously inserted into or extracted from the negative electrode active material even if the charging and discharging reactions are repeated, for a reason similar to that described above in relation to the active material. In addition, the irreversible capacity decreases upon initial-cycle charging and discharging, making it possible to obtain a high capacity upon the initial-cycle charging and discharging, for a reason similar to that described above in relation to the active material. It is therefore possible to achieve a superior charge and discharge characteristic.

In particular, the secondary battery may include a lithium-ion secondary battery. In this case, a sufficient battery capacity is stably obtainable through the use of insertion and extraction of lithium. It is thus possible to achieve higher effects.

Other action and effects of the secondary battery are similar to those of the active material described above.

Next, a description is given of modifications of the active material and the secondary battery described herein according to an embodiment. The configuration of each of the active material and the secondary battery may be changed as appropriate as described below. Note that any two or more of the following series of modifications may be combined with each other.

The active material 100 illustrated in FIG. 1 includes the center part 101 and the covering part 102. However, the active material 100 may include only the center part 101 and may not include the covering part 102. In this case, the covering part 102 may be removed after the active material 100 including the center part 101 and the covering part 102 is manufactured. In this case also, the electrode reactant is insertable into and extractable from the active material 100 (the center part 101), and similar effects are therefore obtainable.

However, to improve the electron conductivity of the active material 100, the active material 100 preferably includes both the center part 101 and the covering part 102 as described above.

The separator 23, which is a porous film, is used. However, although not specifically illustrated here, a separator of a stacked type including a polymer compound layer may be used instead of the separator 23, which is the porous film.

Specifically, the separator of the stacked type includes a porous film having two opposed surfaces, and the polymer compound layer disposed on one of or each of the two opposed surfaces of the porous film. A reason for this is that adherence of the separator to each of the positive electrode 21 and the negative electrode 22 improves to suppress misalignment (irregular winding) of the battery device 20. This suppresses swelling of the secondary battery even if, for example, a decomposition reaction of the electrolytic solution occurs. The polymer compound layer includes a polymer compound such as polyvinylidene difluoride. A reason for this is that the polymer compound such as polyvinylidene difluoride has superior physical strength and is electrochemically stable.

Note that the porous film, the polymer compound layer, or both may each include one or more kinds of insulating particles. A reason for this is that the insulating particles dissipate heat upon heat generation by the secondary battery, thus improving safety or heat resistance of the secondary battery. The insulating particles include one or more of insulating materials including, without limitation, an inorganic material and a resin material. Specific examples of the inorganic material include aluminum oxide, aluminum nitride, boehmite, silicon oxide, titanium oxide, magnesium oxide, and zirconium oxide. Specific examples of the resin material include acrylic resin and styrene resin.

In a case of fabricating the separator of the stacked type, a precursor solution including, without limitation, the polymer compound and a solvent is prepared, following which the precursor solution is applied on one of or each of the two opposed surfaces of the porous film. In this case, insulating particles may be added to the precursor solution on an as-needed basis.

In this case also, lithium ions are movable between the positive electrode 21 and the negative electrode 22, and similar effects are therefore obtainable. In this case, in particular, the irregular winding of the battery device 20 is suppressed as described above. It is therefore possible to achieve higher effects.

The electrolytic solution, which is a liquid electrolyte, is used. However, although not specifically illustrated here, an electrolyte layer, which is a gel electrolyte, may be used instead of the electrolytic solution.

In the battery device 20 including the electrolyte layer, the positive electrode 21 and the negative electrode 22 are stacked on each other with the separator 23 and the electrolyte layer interposed therebetween, and the stack of the positive electrode 21, the negative electrode 22, the separator 23, and the electrolyte layer is wound. The electrolyte layer is interposed between the positive electrode 21 and the separator 23, and between the negative electrode 22 and the separator 23.

Specifically, the electrolyte layer includes a polymer compound together with the electrolytic solution. The electrolytic solution is held by the polymer compound. A reason for this is that leakage of the electrolytic solution is prevented. The configuration of the electrolytic solution is as described above. The polymer compound includes, for example, polyvinylidene difluoride. In a case of forming the electrolyte layer, a precursor solution including, for example, the electrolytic solution, the polymer compound, and a solvent is prepared, following which the precursor solution is applied on one side or both sides of the positive electrode 21 and on one side or both sides of the negative electrode 22.

In this case also, lithium ions are movable between the positive electrode 21 and the negative electrode 22 via the electrolyte layer, and similar effects are therefore obtainable. In this case, the leakage of the electrolytic solution is prevented as described above. It is therefore possible to achieve higher effects.

In FIG. 5, the secondary battery includes one positive electrode lead 31. However, the secondary battery may include two or more positive electrode leads 31. In this case also, the secondary battery is able to be energized using the positive electrode leads 31, and similar effects are therefore obtainable. In particular, the increase in the number of the positive electrode leads 31 results in a decrease in electric resistance of the battery device 20. It is therefore possible to achieve higher effects.

The description given here in relation to the number of the positive electrode leads 31 also applies to the number of the negative electrode leads 32. That is, although the secondary battery includes one negative electrode lead 32 in FIG. 5, the secondary battery may include two or more negative electrode leads 32. In this case also, the secondary battery is able to be energized using the negative electrode leads 32, and similar effects are therefore obtainable. In particular, the increase in the number of the negative electrode leads 32 results in a decrease in the electric resistance of the battery device 20. It is therefore possible to achieve higher effects.

A description is given next of applications (application examples) of the secondary battery described above.

The applications (application examples) of the secondary battery are not particularly limited. The secondary battery used as a power source serves as a main power source or an auxiliary power source of, for example, electronic equipment and an electric vehicle. The main power source is preferentially used regardless of the presence of any other power source. The auxiliary power source is used in place of the main power source, or is switched from the main power source.

Specific examples of the applications of the secondary battery include: electronic equipment; apparatuses for data storage; electric power tools; battery packs to be mounted on, for example, electronic equipment; medical electronic equipment; electric vehicles; and electric power storage systems. Examples of the electronic equipment include video cameras, digital still cameras, mobile phones, laptop personal computers, headphone stereos, portable radios, and portable information terminals. Examples of the apparatuses for data storage include backup power sources and memory cards. Examples of the electric power tools include electric drills and electric saws. Examples of the medical electronic equipment include pacemakers and hearing aids. Examples of the electric vehicles include electric automobiles including hybrid automobiles. Examples of the electric power storage systems include home battery systems or industrial battery systems for accumulation of electric power for a situation such as emergency. The above-described applications may each use one secondary battery, or may each use multiple secondary batteries.

The battery packs may each include a single battery, or may each include an assembled battery. The electric vehicle is a vehicle that operates (travels) using the secondary battery as a driving power source, and may be a hybrid automobile that is additionally provided with a driving source other than the secondary battery. In an electric power storage system for home use, electric power accumulated in the secondary battery serving as an electric power storage source may be utilized for using, for example, home appliances.

An application example of the secondary battery will now be described in detail. The configuration of the application example described below is merely an example, and is appropriately modifiable.

Figure 8:
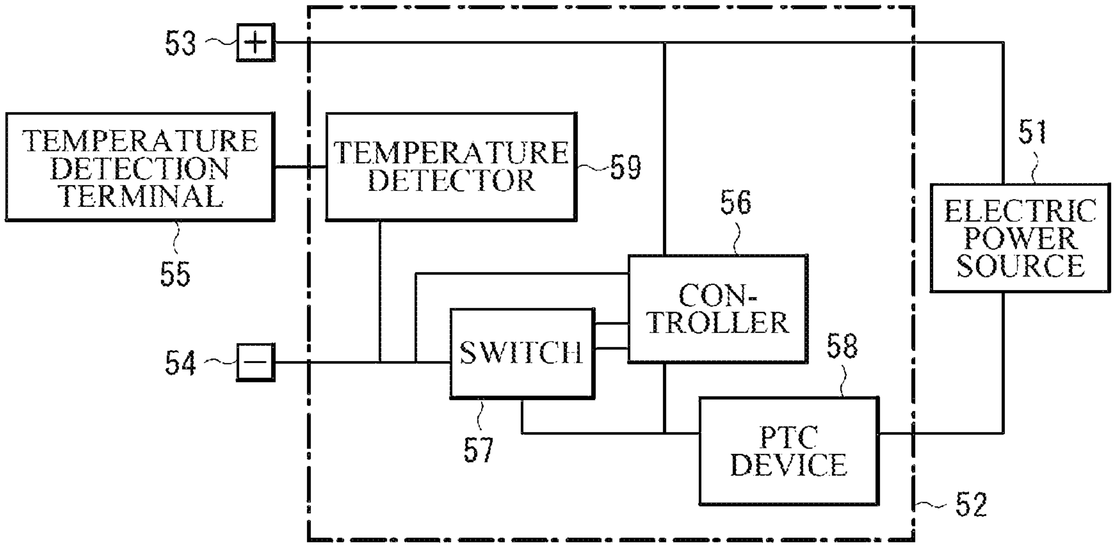
FIG. 8 is a block diagram illustrating a configuration of an application example of the secondary battery.

FIG. 8 illustrates a block configuration of a battery pack. The battery pack described here is a battery pack (what is called a soft pack) including one secondary battery, and is to be mounted on, for example, electronic equipment typified by a smartphone.

As illustrated in FIG. 8, the battery pack includes an electric power source 51 and a circuit board 52. The circuit board 52 is coupled to the electric power source 51, and includes a positive electrode terminal 53, a negative electrode terminal 54, and a temperature detection terminal 55.

The electric power source 51 includes one secondary battery. The secondary battery has a positive electrode lead coupled to the positive electrode terminal 53 and a negative electrode lead coupled to the negative electrode terminal 54. The electric power source 51 is couplable to outside via the positive electrode terminal 53 and the negative electrode terminal 54, and is thus chargeable and dischargeable. The circuit board 52 includes a controller 56, a switch 57, a thermosensitive resistive device (a PTC device) 58, and a temperature detector 59. However, the PTC device 58 may be omitted.

The controller 56 includes, for example, a central processing unit (CPU) and a memory, and controls an overall operation of the battery pack. The controller 56 detects and controls a use state of the electric power source 51 on an as-needed basis.

If a voltage of the electric power source 51 (the secondary battery) reaches an overcharge detection voltage or an overdischarge detection voltage, the controller 56 turns off the switch 57. This prevents a charging current from flowing into a current path of the electric power source 51. The overcharge detection voltage is not particularly limited, and is specifically 4.2 V±0.05 V. The overdischarge detection voltage is not particularly limited, and is specifically 2.4 V±0.1 V.

The switch 57 includes, for example, a charge control switch, a discharge control switch, a charging diode, and a discharging diode. The switch 57 performs switching between coupling and decoupling between the electric power source 51 and external equipment in accordance with an instruction from the controller 56. The switch 57 includes, for example, a metal-oxide-semiconductor field-effect transistor (MOSFET). The charging and discharging currents are detected based on an ON-resistance of the switch 57.

The temperature detector 59 includes a temperature detection device such as a thermistor. The temperature detector 59 measures a temperature of the electric power source 51 using the temperature detection terminal 55, and outputs a result of the temperature measurement to the controller 56. The result of the temperature measurement to be obtained by the temperature detector 59 is used, for example, in a case where the controller 56 performs charge and discharge control upon abnormal heat generation or in a case where the controller 56 performs a correction process upon calculating a remaining capacity.

EXAMPLES

A description is given of Examples of the present technology according to an embodiment.

Examples 1 to 4 and Comparative Examples 1 to 4

Figure 9:
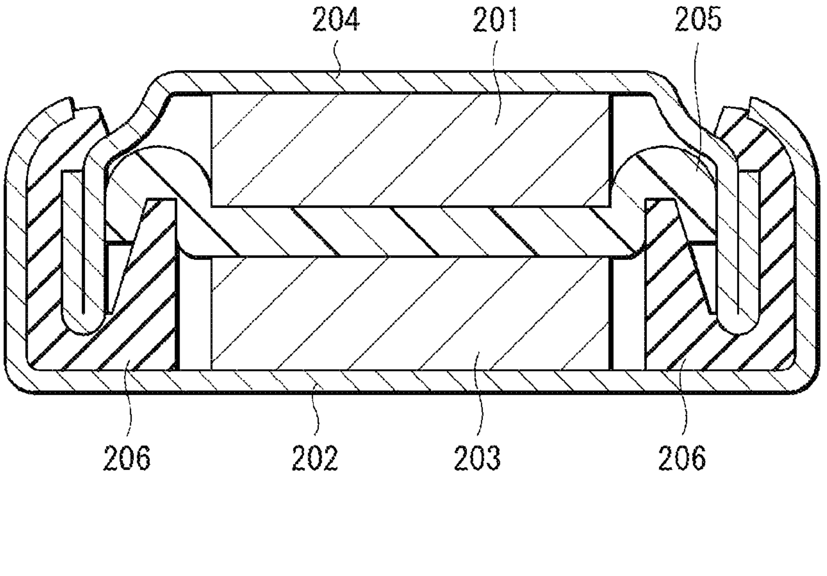
FIG. 9 is a sectional view of a configuration of a secondary battery of a coin type for testing.

FIG. 9 illustrates a sectional configuration of a secondary battery of a coin type for testing. In the following, negative electrode active materials were manufactured, and secondary batteries of the coin type were fabricated using the negative electrode active materials. Thereafter, the secondary batteries were evaluated for their respective battery characteristics.

As illustrated in FIG. 9, the secondary battery of the coin type included a test electrode 201 inside an outer package cup 204, and included a counter electrode 203 inside an outer package can 202. The test electrode 201 and the counter electrode 203 were stacked on each other with a separator 205 interposed therebetween, and the outer package can 202 and the outer package cup 204 were crimped to each other by means of a gasket 206. The test electrode 201, the counter electrode 203, and the separator 205 were each impregnated with an electrolytic solution.

[Manufacture of Negative Electrode Active Material]

First, silicate glass was prepared as a raw material. The contents (at %) of the series of constituent elements (silicon, the first element, the second element, and the third element) in lithium-containing carbon-reduced silicate glass synthesized using the silicate glass were as listed in Table 1.

Thereafter, the silicate glass was mixed with a carbon source (carbon black that was a carbon material) to thereby obtain a mixture. In this case, a mixture ratio (weight ratio) of the silicate glass to the carbon source was 5:1.

Thereafter, a slurry was prepared by adding a binder solution (N-methyl-2-pyrrolidone solution of polyimide, solid content=18.6%) to the mixture and stirring the mixture at a rotation speed of 2000 rpm for a stirring time of 3 minutes using a stirring apparatus (rotating and revolving mixer, Awatori Rentaro, available from THINKY Corporation). In this case, an amount of the binder solution added to the mixture was 10 wt % (solid content ratio).

Thereafter, the slurry was dried in an oven at a temperature of 80° C. to obtain a dried product, following which the dried product was pulverized into pulverized flakes.

Thereafter, the pulverized flakes were put into an alumina boat, following which the pulverized flakes were heated at a heating temperature of 950° C. for a heating time of 10 hours in an argon atmosphere in a vacuum gas displacement furnace. In this case, the silicate glass was reduced in the presence of the carbon source by the carbon reduction treatment to synthesize the carbon-reduced silicate glass. As a result, a center part including the carbon-reduced silicate glass was formed. Further, a substance such as a decomposition product of the carbon source (organic substance decomposition carbon) was deposited on the surface of the center part, forming a covering part. Thus, an active material precursor was obtained that included the center part, including the carbon-reduced silicate glass, and the covering part.

Thereafter, in a glove box filled with argon gas, 1.6 g of an organic compound (naphthalene) was added to 50 $cm^3$ of a solvent (N-butyl methyl ether as an organic solvent), following which the solvent was stirred. The organic compound was thereby dissolved in the solvent. Thus, a colorless and transparent solution was prepared. Thereafter, 0.1 g of a lithium foil (having a thickness of 0.8 mm) as a lithium source was put into the solvent, following which the solution was stirred for a stirring time of 5 hours using a stirrer. The lithium foil was thereby dissolved in the solution, and the lithium foil reacted with the organic compound. As a result, an organic lithium solution (a lithium naphthalenide solution) was prepared.

Thereafter, to add lithium chemically to the active material precursor, the active material precursor was put into the organic lithium solution in the glove box described above to thereby cause the active material precursor to react with the organic lithium solution for a reaction time of 24 hours. Thereafter, a reaction product was taken out of the organic lithium solution, following which the reaction product was filtered in a dry room. Thereafter, the reaction product was washed with a solvent (dimethyl carbonate as an organic solvent), following which the reaction product was subjected to vacuum drying (at a drying temperature of 80° C.). The active material precursor was thereby doped with lithium by the lithium doping treatment. Thus, the lithium-containing carbon-reduced silicate glass was synthesized. As a result, a negative electrode active material in a flake form was obtained that included the center part, including the lithium-containing carbon-reduced silicate glass, and the covering part.

Lastly, the negative electrode active material in the flake form was pulverized in a mortar into the negative electrode active material in a powder form, following which the negative electrode active material in the powder form was sieved using a mesh (53 μm).

For comparison, a negative electrode active material was manufactured by a similar procedure except that no lithium doping treatment was performed. The negative electrode active material included the center part, including carbon-reduced silicate glass, and the covering part.

When the state of the negative electrode active material was observed using a scanning electron microscope (SEM), the negative electrode active material remained in the powder form without being melted, even though the pulverized frames were heated at a temperature (=950° C.) higher than a glass transition temperature (=about 700° C.) of the silicate glass in the carbon reduction treatment. A reason for this is considered to be that the center part including the lithium-containing carbon-reduced silicate glass was covered with the covering part.

When the negative electrode active material was analyzed by X-ray diffraction analysis (XRD), a broad halo pattern was detected within a range of 2θ from 20° to 25° both inclusive, despite the carbon reduction treatment on the silicate glass. Accordingly, it was confirmed that the negative electrode active material (the lithium-containing carbon-reduced silicate glass) had not been crystallized.

Further, when the negative electrode active material was analyzed by Raman spectroscopy, distinct G and D bands were detected in the Raman spectrum. Accordingly, it was confirmed that the center part was covered with the covering part including carbon as a constituent element.

The results of analysis of the negative electrode active material using XPS were as listed in Table 1. In this case, the position of the apex XAT (binding energy: eV) was examined based on the result of the analysis of the negative electrode active material (the XPS spectrum of Si2p illustrated in FIG. 2) in accordance with the procedure described above.

The results of analysis of the negative electrode active material using Raman spectroscopy were as listed in Table 1. In this case, the position of the apex RAT (Raman shift: $cm^{-1}$) was examined based on the result of the analysis of the negative electrode active material (the Raman spectrum illustrated in FIG. 3) in accordance with the procedure described above.

[Fabrication of Secondary Battery]

The test electrode 201 was fabricated and an electrolytic solution was prepared, following which the secondary battery of the coin type was fabricated using, for example, the test electrode 201 and the electrolytic solution in accordance with the following procedure.

(Fabrication of Test Electrode)

Here, a negative electrode was fabricated as the test electrode 201. First, the negative electrode active material described above, a negative electrode binder precursor (polyamic acid solution (polyimide precursor), U-varnish-A, available from Ube Industries, Ltd.), and two negative electrode conductors (carbon powder KS6 available from TIMCAL Co., Ltd., and acetylene black, Denca black (registered trademark) available from Denka Co., Ltd.) were mixed with each other to thereby obtain a negative electrode mixture. In this case, a mixture ratio (mass ratio) among the negative electrode active material, the negative electrode binder precursor, and the two negative electrode conductors was 7:0.5:1:0.25. Thereafter, the negative electrode mixture was put into a solvent (N-methyl-2-pyrrolidone that was an organic solvent), following which the solvent was stirred to thereby prepare a negative electrode mixture slurry in a paste form.

Thereafter, the negative electrode mixture slurry was applied to one side of a negative electrode current collector (a copper foil having a thickness of 15 μm) using a coating apparatus, following which the negative electrode mixture slurry was heated and dried (at a heating temperature of 425° C.) in a vacuum sintering furnace. A negative electrode binder (polyimide) was thereby synthesized, forming a negative electrode active material layer including the negative electrode active material, the negative electrode binder, and the negative electrode conductor. Lastly, the negative electrode current collector on which the negative electrode active material layer had been formed was punched into a disk shape (having an outer diameter of 15 mm), following which the negative electrode active material layer was compression-molded using a roll pressing machine. As a result, the test electrode 201 was fabricated as the negative electrode.

(Preparation of Counter Electrode)

As the counter electrode 203, a lithium metal plate was used. In this case, a lithium metal foil was punched into a disk shape (having an outer diameter of 15 mm).

(Preparation of Electrolytic Solution)

An electrolyte salt (lithium hexafluoride phosphate) was added to a solvent (ethylene carbonate, fluoroethylene carbonate, and dimethyl carbonate), following which the solvent was stirred. In this case, a mixture ratio (mass ratio) of the solvent among ethylene carbonate, fluoroethylene carbonate, and dimethyl carbonate was 40:10:50. The content of the electrolyte salt was 1 mol/kg with respect to the solvent.

(Assembly of Secondary Battery)

First, the test electrode 201 was housed inside the outer package cup 204, and the counter electrode 203 was housed inside the outer package can 202. Thereafter, the test electrode 201 housed inside the outer package cup 204 and the counter electrode 203 housed inside the outer package can 202 were stacked on each other with the separator 205 (a microporous polyethylene film having a thickness of 5 μm), impregnated with the electrolytic solution, interposed therebetween. Thus, the test electrode 201 and the counter electrode 203 were each impregnated with a portion of the electrolytic solution contained in the separator 205. Lastly, the outer package can 202 and the outer package cup 204 were crimped to each other by means of the gasket 206 in a state in which the test electrode 201 and the counter electrode 203 were stacked on each other with the separator 205 interposed therebetween. Accordingly, the test electrode 201, the counter electrode 203, the separator 205, and the electrolytic solution were sealed by the outer package can 202 and the outer package cup 204. As a result, the secondary battery of the coin type was assembled.

(Stabilization of Secondary Battery)

The secondary battery was charged and discharged for one cycle in an ambient temperature environment (at a temperature of 23° C.). Upon the charging, the secondary battery was charged with a constant current of 0.1 C until a voltage reached 4.2 V, and was thereafter charged with a constant voltage of 4.2 V until a current reached 0.05 C. Upon the discharging, the secondary battery was discharged with a constant current of 0.1 C until the voltage reached 2.5 V. Note that 0.1 C was a value of a current that caused a battery capacity (a theoretical capacity) to be completely discharged in 10 hours, and 0.05 C was a value of a current that caused the battery capacity to be completely discharged in 20 hours. As a result, the secondary battery of the coin type was completed.

Evaluation of the charge and discharge characteristic as the battery characteristic of the secondary batteries revealed the results presented in Table 1. Here, a charge characteristic, a discharge characteristic, an initial-cycle charge and discharge characteristic, and an irreversible capacity characteristic were examined as the charge and discharge characteristic.

In a case of examining the charge and discharge characteristic, first, the secondary battery was charged in an ambient temperature environment (at a temperature of 23° C.) to thereby measure a first-cycle charge capacity (mAh). A charge capacity per unit weight (mAh/g) used as an index for evaluating the charge characteristic was thereby calculated based on a weight (g) of the negative electrode active material.

Thereafter, the charged secondary battery was discharged in the same environment to thereby measure a first-cycle discharge capacity (mAh). A discharge capacity per unit weight (mAh/g) used as an index for evaluating the discharge characteristic was thereby calculated based on the weight (g) of the negative electrode active material.

Lastly, an initial efficiency used as an index for evaluating the initial-cycle charge and discharge characteristic was calculated based on the following calculation expression: initial efficiency (%)=(first-cycle discharge capacity/first-cycle charge capacity)×100. In addition, the irreversible capacity used as another index for evaluating the irreversible capacity characteristic was calculated based on the following calculation expression: irreversible capacity (mAh/g)=charge capacity per unit weight−discharge capacity per unit. Note that charging and discharging conditions were similar to those in the case of stabilizing the secondary battery.

electrode active material using XPS and Raman spectroscopy (the XPS spectrum of Si2p and the Raman spectrum) satisfied the following conditions, and where the negative electrode active material had been doped with lithium in advance (Examples 1 to 4), the discharge capacity sufficiently increased with respect to the charge capacity, and a high initial efficiency was thus obtained owing to a decrease in the irreversible capacity, as compared with a case where the conditions were not satisfied (Comparative examples 1 to 4).

The conditions regarding the composition of the negative electrode active material were as follows. The negative electrode active material included silicon, oxygen, the first element, the second element, and the third element as constituent elements. The content of silicon with respect to all the constituent elements excluding lithium, oxygen, and carbon was within the range from 60 at % to 98 at % both inclusive. The content of the first element with respect to all the constituent elements excluding lithium, oxygen, and carbon was within the range from 1 at % to 15 at % both inclusive. The content of the second element with respect to all the constituent elements excluding lithium, oxygen, and carbon was within the range from 1 at % to 34 at % both inclusive. The content of the third element with respect to all the constituent elements excluding lithium, oxygen, and carbon was within the range from 0 at % to 6 at % both inclusive.

The conditions regarding the results of the analysis of the negative electrode active material were as follows. In the XPS spectrum of Si2p measured by XPS, the peak XA was detected that had the apex XAT (at a position within the range of the binding energy from 100 eV to 102 eV both inclusive) illustrated in FIG. 2 (the first physical property). In addition, in the Raman spectrum measured by Raman spectroscopy, the peak RA was detected that had the apex RAT (at a position within the range of the Raman shift from $600\ cm^{-1}$ to $640\ cm^{-1}$ both inclusive) illustrated in FIG. 3 (the second physical property).

TABLE 1

| | | Constituent element (content (at %)) | | | | First physical property (XPS spectrum) | Second physical property (Raman spectrum) | Charge | Discharge | Initial | Irreversible |
|---|---|---|---|---|---|---|---|---|---|---|---|
| | Lithium doping | Silicon | First element | Second element | Third element | Apex (eV) | Apex ($cm^{-1}$) | capacity (mAh/g) | capacity (mAh/g) | efficiency (%) | capacity (mAh/g) |
| Example 1 | Performed | 98 | 1 | 1 | — | 101.0 | 626 | 670 | 530 | 79.1 | 140 |
| Example 2 | Performed | 80 | 15 | 15 | — | 101.8 | 632 | 720 | 540 | 75.0 | 180 |
| Example 3 | Performed | 75 | 2 | 17 | 6 | 100.5 | 632 | 915 | 740 | 80.9 | 175 |
| Example 4 | Performed | 60 | 6 | 34 | — | 101.5 | 615 | 865 | 635 | 73.4 | 230 |
| Comparative example 1 | Not performed | 98 | 1 | 1 | — | 103.2 | 465 | 960 | 525 | 54.7 | 435 |
| Comparative example 2 | Not performed | 80 | 15 | 15 | — | 103.8 | 462 | 1230 | 610 | 49.6 | 620 |
| Comparative example 3 | Not performed | 75 | 2 | 17 | 6 | 102.9 | 454 | 1170 | 790 | 67.5 | 380 |
| Comparative example 4 | Not performed | 60 | 6 | 34 | — | 103.2 | 455 | 1020 | 485 | 47.5 | 535 |

As apparent from Table 1, the charge and discharge characteristic (the charge characteristic, the discharge characteristic, the initial-cycle charge and discharge characteristic, and the irreversible capacity characteristic) greatly varied depending on the composition and the physical property of the negative electrode active material.

Specifically, in a case where the composition of the negative electrode active material satisfied the following conditions, where the results of the analysis of the negative As in the results presented in Table 1, in the case where the above-described conditions regarding the composition of the negative electrode active material were satisfied and where the above-described conditions (the first physical property and the second physical property) regarding the results of the analysis of the negative electrode active material were satisfied, the charge and discharge characteristic was improved. The secondary battery therefore achieved a superior charge and discharge characteristic.

Although the present technology has been described above with reference to one or more embodiments including Examples, the configuration of the present technology is not limited to those described herein, and is therefore modifiable in a variety of suitable ways.

The description has been given of the case where the secondary battery has a battery structure of the laminated-film type or the coin type; however, the battery structure is not particularly limited in kind. Specifically, the battery structure may be, for example, of a cylindrical type, a prismatic type, or a button type.

Further, the description has been given of the case where the battery device has a device structure of a wound type; however, the device structure of the battery device is not particularly limited in kind. Specifically, the device structure may be, for example, of a stacked type in which the electrodes (the positive electrode and the negative electrode) are stacked on each other, a zigzag folded type in which the electrodes are folded in a zigzag manner, or any other device structure.

Further, although the description has been given of the case where the electrode reactant is lithium, the electrode reactant is not particularly limited in kind. Specifically, the electrode reactant may be another alkali metal such as sodium or potassium, or may be an alkaline earth metal such as beryllium, magnesium, or calcium, as described above. Alternatively, the electrode reactant may be another light metal such as aluminum.

The effects described herein are mere examples, and effects of the present technology are therefore not limited to those described herein. Accordingly, the present technology may achieve any other suitable effect.

It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An active material comprising, as constituent elements:

lithium;

silicon;

oxygen;

a first element including boron, phosphorus, or both;

a second element including at least one of an alkali metal element, a transition element, or a typical element, the alkali metal element excluding lithium, the typical element excluding lithium, silicon, oxygen, boron, phosphorus, the alkali metal element, and an alkaline earth metal element; and a third element including the alkaline earth metal element, wherein a content of silicon with respect to all the constituent elements excluding lithium, oxygen, and carbon is greater than or equal to 60 atomic percent and less than or equal to 98 atomic percent, a content of the first element with respect to all the constituent elements excluding lithium, oxygen, and carbon is greater than or equal to 1 atomic percent and less than or equal to 15 atomic percent, a content of the second element with respect to all the constituent elements excluding lithium, oxygen, and carbon is greater than or equal to 1 atomic percent and less than or equal to 34 atomic percent, a content of the third element with respect to all the constituent elements excluding lithium, oxygen, and carbon is greater than or equal to 0 atomic percent and less than or equal to 6 atomic percent, a first peak is detectable in an XPS spectrum of Si2p relating to the active material, the XPS spectrum of Si2p being measured by X-ray photoelectron spectroscopy (XPS) and defined by a horizontal axis representing a binding energy (electronvolt) and a vertical axis representing a spectrum intensity, the first peak having an apex within a range of the binding energy of greater than or equal to 100 electronvolts and less than or equal to 102 electronvolts, and a second peak is detectable in a Raman spectrum relating to the active material, the Raman spectrum being measured by Raman spectroscopy and defined by a horizontal axis representing a Raman shift (wavenumber) and a vertical axis representing a spectrum intensity, the second peak having an apex within a range of the Raman shift of greater than or equal to 600 wavenumbers and less than or equal to 640 wavenumbers.

2. The active material according to claim 1, comprising:

a center part including lithium, silicon, oxygen, the first element, the second element, and the third element as constituent elements, the first peak being detectable in the XPS spectrum relating to the center part, the second peak being detectable in the Raman spectrum relating to the center part; and a covering part covering at least a portion of a surface of the center part and including carbon as a constituent element.

3. An electrode comprising the active material according to claim 1.

4. A secondary battery comprising:

a positive electrode;

a negative electrode including the active material according to claim 1; and an electrolytic solution.

5. The secondary battery according to claim 4, wherein the secondary battery is a lithium-ion secondary battery.

* * * * *